United States Patent
Stoddard et al.

(10) Patent No.: US 6,807,795 B2
(45) Date of Patent: Oct. 26, 2004

(54) PERFORATED FLAP WITH DUAL SEALS

(75) Inventors: Luther B. Stoddard, Mead, CO (US); Jerry Dale Pack, Pauls Valley, OK (US)

(73) Assignee: Burford Corp., Maysville, OK (US)

( * ) Notice: Subject to any disclaimer, the term of this patent is extended or adjusted under 35 U.S.C. 154(b) by 0 days.

(21) Appl. No.: 10/029,307

(22) Filed: Dec. 19, 2001

(65) Prior Publication Data

US 2002/0152722 A1 Oct. 24, 2002

Related U.S. Application Data

(63) Continuation-in-part of application No. 09/701,478, filed on Feb. 1, 2001
(60) Provisional application No. 60/256,884, filed on Dec. 19, 2000.

(51) Int. Cl.[7] .............................................. B65B 51/00
(52) U.S. Cl. ...................... 53/417; 53/136.5; 53/138.7; 53/138.8
(58) Field of Search ................................ 53/417, 136.5, 53/138.7, 138.8, 139.1, 416, 133.6, 412

(56) References Cited

U.S. PATENT DOCUMENTS

| | | | |
|---|---|---|---|
| 3,576,694 A | | 4/1971 | Greisman |
| 3,834,113 A | * | 9/1974 | Howe et al. |
| 3,990,216 A | * | 11/1976 | Martin ...................... 53/138.8 |
| 4,682,976 A | | 7/1987 | Martin et al. |
| 5,155,799 A | * | 10/1992 | Andersson et al. ......... 392/473 |
| 5,303,751 A | * | 4/1994 | Slater et al. ................ 141/329 |
| 5,600,938 A | * | 2/1997 | Trimble ........................ 53/417 |
| 5,708,339 A | * | 1/1998 | Frazier et al. .............. 318/468 |
| 5,816,019 A | * | 10/1998 | Saget et al. ................ 53/373.9 |
| 5,937,615 A | * | 8/1999 | Forman ..................... 53/133.4 |

FOREIGN PATENT DOCUMENTS

| | | | |
|---|---|---|---|
| CA | 2064270 | * | 9/1993 |
| WO | WO 99 03731 A | | 1/1999 |

* cited by examiner

Primary Examiner—Eugene Kim
(74) Attorney, Agent, or Firm—Crutsinger & Booth, LLC

(57) ABSTRACT

A method and apparatus for forming a tamper resistant seal on a plastic bag containing a loaf of bread or other products is disclosed. The neck of the bag is flattened, gripped between a pair of upper inboard and outboard gathering belts and a pair of lower inboard and outboard gathering belts adjacent opposite sides of a segment of the neck of the bag. A row of perforations is formed in the bag neck as the bag moves adjacent a roller provided with teeth or cutting elements. Heated air jets are directed to engage the segment of the bag bridging between the inboard and the outboard gathering belts for fusing panels of the bag together to form a sealed strip spaced from the row of perforations in the bag neck to facilitate removal of the sealed strip from the bag.

14 Claims, 19 Drawing Sheets

BAG SEALING PROFILE FOR PRODUCTION SETUP
psi equal 25
MAXIMUM TEMPERATURE 600°F.

| Conveyor Speed FPM | 60 | 50 | 40 | 34 | 28 |
|---|---|---|---|---|---|
| Servo-tyer FPM | 125 | 104 | 85 | 71 | 56 |
| Servo belt setting | 11 | 10 | 9 | 8 | 7 |
| Bag 2.0 mil | N/A | N/A | 600 | 550 | 475 |
| Bag 1.5 mil | 500 | 535 | 500 | 485 | 440 |
| Bag 1 mil | 550 | 475 | 445 | 415 | 385 |

Note: The above temperatures are used as a guide only. Bag characteristics may require temperature adjustment for bag quality.

PERFORATED FLAP WITH DUAL SEALS

CROSS REFERENCE TO RELATED APPLICATIONS

This application claims the benefit of the filing date of Provisional Application Ser. No. 60/256,884 filed Dec. 19, 2000 entitled PERFORATED FLAP WITH DUAL SEALS is a continuation-in-part of application No. 09/701,478, filed Feb. 1, 2001 entitled TAMPER RESISTANT CLOSURE.

TECHNICAL FIELD

The invention relates to a tamper resistant closure attachment accessory to a machine for wrapping a ribbon around the gathered neck of a bag and twisting the ribbon for closing and sealing the neck of the flexible bag.

BACKGROUND OF INVENTION

U.S. Pat. No. 3,138,904 entitled "METHOD AND APPARATUS FOR TYING PACKAGES AND WRAPPING MATERIALS;" U.S. Pat. No. 3,059,670 entitled "WIRE TWISTING TOOL;" U.S. Pat. No. 3,919,829 entitled "APPARATUS FOR TYING PACKAGES AND WRAPPING MATERIALS;" U.S. Pat. No. 4,856,258 entitled "WIRE TYING DEVICE;" and U.S. Pat. No. 5,483,134 entitled "RIBBON SENSING DEVICE FOR BAG TYER" disclose apparatus used for closing a plastic bag by attaching and twisting a wire-like ribbon about the neck of the bag.

Bag tying devices of the type disclosed in the aforementioned patents are commercially available from Burford Corporation of Maysville, Okla. The tying devices are generally constructed to receive packages such as loaves of bread at speeds of for example over one hundred (100) packages per minute at speeds of about 108 feet per minute.

Plastic bags containing bakery products, paper plates and ice are easily opened by removing the twisted ribbon from about the neck of the bag so that the contents of the bag are accessible. The bag can be resealed by manually replacing and twisting the ribbon about the neck of the bag.

U.S. Pat. No. 5,600,938 discloses apparatus for sealing a plurality of spaced spots across the flattened open end of a filled plastic bag. The bag is moved along a conveyor past a sealing mechanism where a plurality of spaced spots are welded or fused across the open end of the bag. In one embodiment a sealing mechanism includes a plurality of heated pins which penetrate the two layers of the open end of the bag while the end of the bag is substantially flat. These pins then move along with the bag in synchronism with the conveyor while the fusing occurs. In another embodiment, the sealing is accomplished by using a wheel having heated pins around its periphery and the wheel is rotated so that its tangential speed is in synchronism with the conveyor to successively make spaced fused spots across the generally flat open end of the bag. The apparatus seals a plurality of spaced spots to only delicately seal the bag to show evidence of tampering by breaking the seal but allow the bag to be opened without tearing or destroying the bag.

U.S. Pat. No. 5,741,075 describes a package comprising a flexible plastic bag and a label, the bag having a closed end, the closed end being openable to provide an opening for access to the contents of the package, wherein, the closed end of the package is initially sealed at a sealing area and, wherein, the sealing area is provided with a line of perforations to define the opening and reclosable by means of the label. The label is disclosed as having on one face two areas of adhesive separated by a non-adhesive area extending across substantially the whole width of the label, the adhesive areas being adapted to adhere to the package, one to each side of the line of perforations. A satisfactory method and apparatus for forming the seal and the line of perforations to provide an initial tamper-evident tear-off strip is not disclosed.

Heretofore, no system has been devised for forming a reclosable tamper-proof seal which can be economically applied for safe-guarding the contents of the bag prior to its being opened by the ultimate consumer.

SUMMARY OF INVENTION

The apparatus disclosed herein is used to form a tamper resistant seal on plastic bags wherein the sides of the bag are welded together for forming a seal adjacent a row of perforations formed in the bag to facilitate tearing the seal from the bag to gain access to the contents. After the seal and perforated strip have been formed on the bag the neck of the bag is gathered and tied by twisting a wire-like ribbon about the neck of the bag.

The apparatus for forming the tamper resistant seal is preferably mounted on a bag tyer, for example of the type disclosed in U.S. Pat. No. 5,483,134, the disclosure of which is incorporated herein by reference in its entirety for all purposes. Gathering belts are mounted on pulleys synchronized with the gathering belts in the bag neck tying device.

The bag neck is flattened adjacent the gathering belts and the flattened bag neck moves adjacent a roller which has projections for forming a row of perforations in the neck of the bag. The bag moves between a pair of manifolds through which heated air flows to impinge against upper and lower surfaces of the bag neck for sealing the bag. The manifolds do not contact the surface of the bag such that the bag neck can be sealed even though printing ink on the surface of the bag may not have dried or cured or if the heat softens the ink.

Once the seal and row of perforations have been formed on the bag, the neck of the bag moves through the tying device where the neck of the bag is gathered, tied and ejected from the tying device in conventional manner.

It should be readily appreciated that in lieu of a twisted wire tie around the gathered neck, other closure means such as plastic wireless twist ties, plastic clips having a slot or adhesive tape may be attached to the gathered neck of the bag. The closure seals the bag between the row of perforations and the contents to prevent contamination and for maintaining freshness of the contents of the bag.

DESCRIPTION OF THE DRAWINGS

Drawings of a preferred embodiment of the invention are annexed hereto, so that the invention may be better and more fully understood, in which:

FIG. 11 is a table showing examples of relationships of conveyor speed, bag thickness and temperature.

Numeral references are employed to designate like parts throughout the various figures of the drawing.

DESCRIPTION OF A PREFERRED EMBODIMENT

Figure 1:
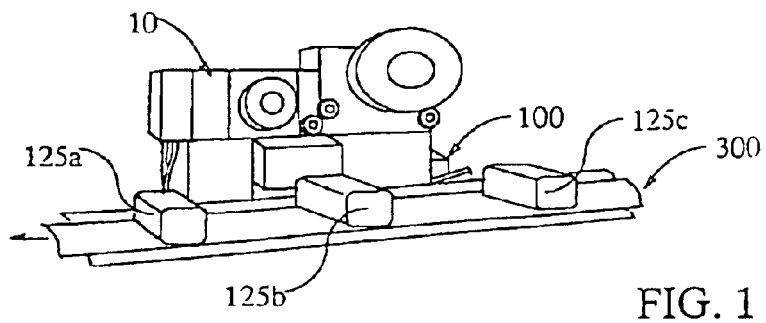
FIG. 1 is a perspective view illustrating the front of a bag neck tying device having apparatus for forming a tamper resistant seal mounted thereon.
Figure 2:
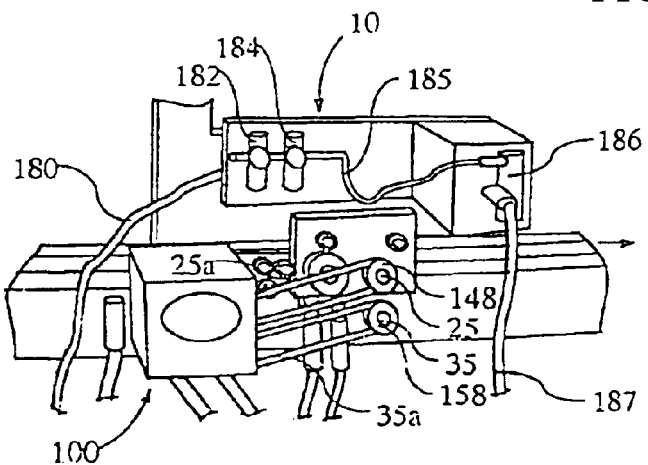
FIG. 2 is an elevational view of the rear of the bag tying device and the apparatus for forming a tamper resistant seal.

The wire tying device, generally designated by the numeral 10 in FIGS. 1 and 2 of the drawing is mounted adjacent a side of conveyor 300 of the type disclosed in Burford U.S. Pat. No. 3,138,904 and Burford U.S. Pat. No. 3,919,829, the disclosures of which are incorporated herein by reference in their entireties for all purposes. Conveyer 300 carries, for example, loaves 125a, 125b and 125c of bread to, through and out of wire tying device 10 in rapid succession. Conveyor 300 is well known to a person skilled in the art and further description is not deemed necessary except in conjunction with the drive mechanism as will be hereinafter more fully explained. It should be appreciated that other and further structures may form the conveyor.

Figure 9:
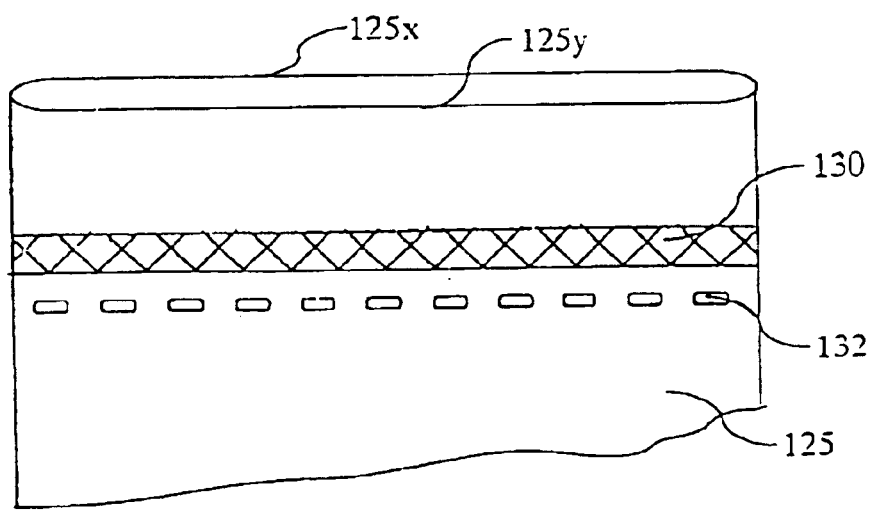
FIG. 9 is a fragmentary diagrammatic view of a sealed strip and a row of perforations formed on the neck of a bag.
Figure 10:
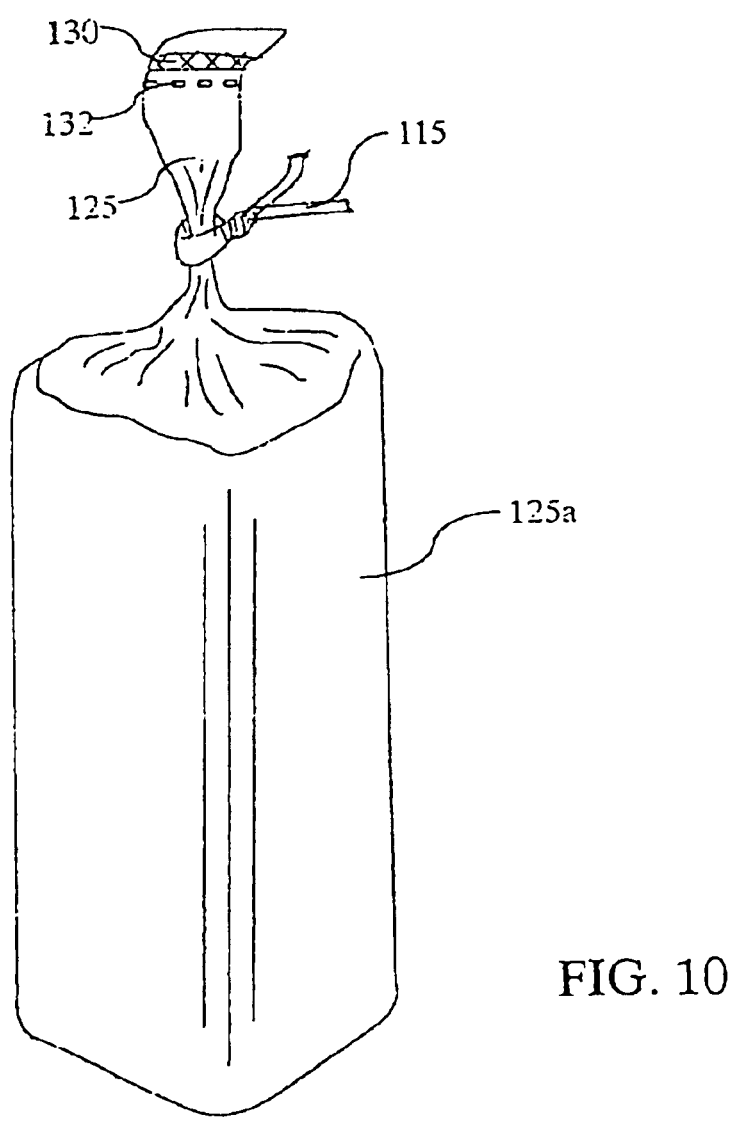
FIG. 10 is a perspective view of a bag showing the relationship of the seal strip, row of perforations and removable closure.

Loaf 125c of bread is moving toward bag tying device 10 and the neck of the bag is positioned adjacent apparatus 100 for forming a tamper resistant closure on the neck of the bag. Bag 125b has been moved by conveyor 300 and the gathering belts to a position where a wire-like ribbon is wrapped around the gathered neck of the bag and twisted. Loaf 125a of bread has moved through tying device 10 and has moved out of the tying device. Referring to FIGS. 9 and 10 of the drawing, apparatus 100 welds the sides 125x and 125y of bag 125 together to form a tamper resistant seal strip 130. A row 132 of perforations is formed in the neck of the bag 125 adjacent seal strip 130 to facilitate removing seal strip 130 from the bag to render the contents of the bag accessible.

Twisted wire-like ribbon 115 closes the bag between perforated strip 132 and the contents of bag 125a.

As best illustrated in FIGS. 9 and 10 of the drawing, opposite sides 12x and 12y of the bag are welded together along seal strip 130 and a row 132 of perforations is formed adjacent seal strip 130. After the tamper resistant seal 130, 132 has been formed on the neck 125 of the bag, any conventional removable closure such as a twisted wire-like tie 115, a plastic clip having a slot that grips the neck of the bag or an adhesive tape may be attached to the neck of the bag for maintaining freshness and to prevent contamination of the contents of the bag. Seal strip 130 can be easily removed by tearing the bag along the row 132 of perforations.

It should be readily apparent that seal strip 130 forms a tamper evident closure for bag 125a and that the contents of the bag are not accessible until seal strip 130 is removed by tearing the bag along row 132 of perforations. Twist tie 115 can then be removed for opening the bag and reattached for resealing the bag.

The apparatus 100 for forming a tamper resistant closure includes a pair of rollers for engaging opposite sides of the neck of the bag for forming row 132 of perforations and a pair of manifolds for directing a heated gas, such as air, to impinge against surfaces of the bag neck adjacent the row 132 of perforations for welding panels of the bag neck together to form the seal strip 130.

Figure 3:
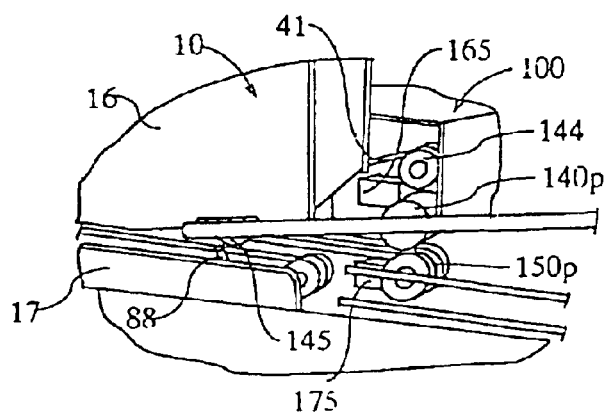
FIG. 3 is a fragmentary enlarged perspective view showing bag neck gathering belts and toothed rollers for forming perforations.
Figure 4:
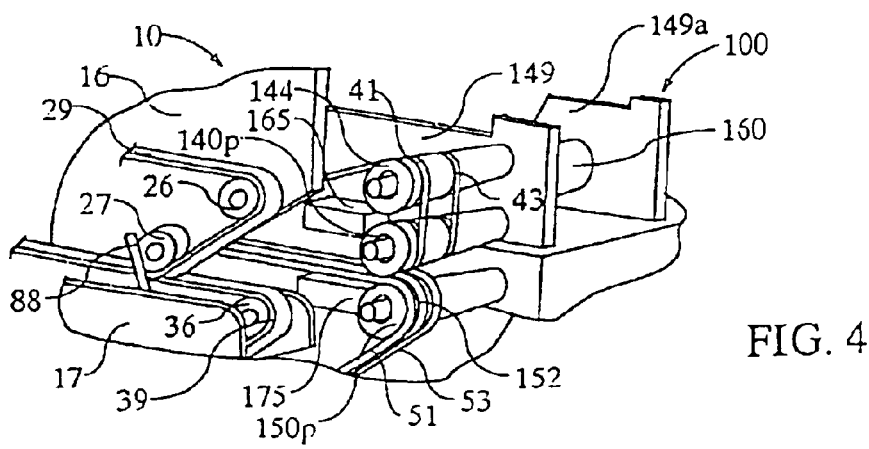
FIG. 4 is an enlarged fragmentary view illustrating rollers for perforating the bag.
Figure 5:
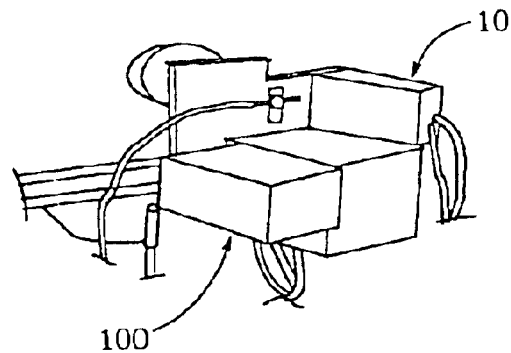
FIG. 5 is a perspective view illustrating the rear and side of the apparatus for forming a tamper resistant seal.
Figure 8:
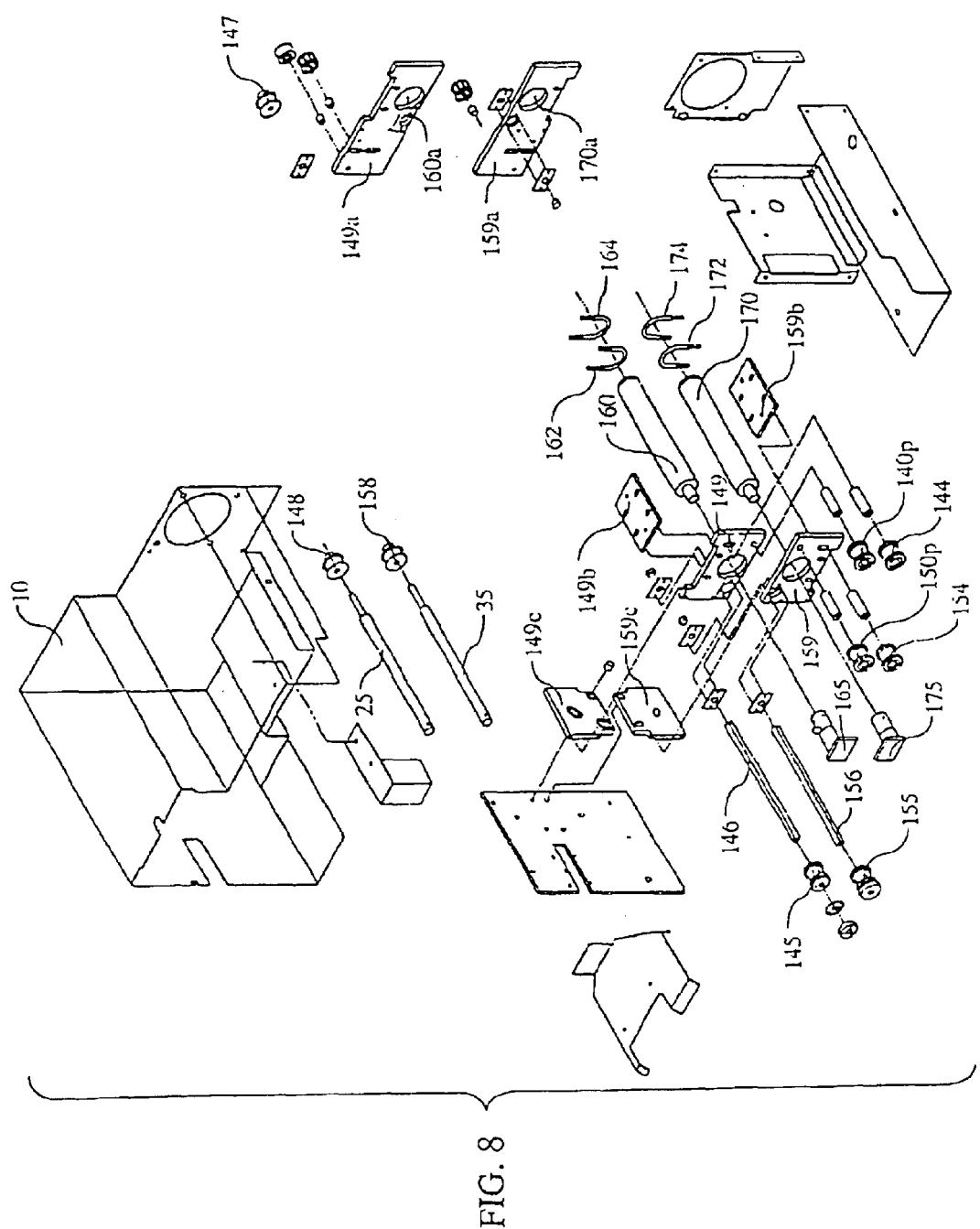
FIG. 8 is an exploded perspective view illustrating parts of the apparatus for forming a tamper resistant seal.

Referring to FIGS. 3, 4 and 8 of the drawing, the numeral 140p generally refers to a roller having teeth 142p formed by the periphery thereof while a roller 150p has a groove 152p formed therein for receiving teeth 142p on roller 140p. As the neck of a bag moves between rollers 140p and 150p the teeth 142p on roller 140p perforate the neck of the bag and form row 132 of perforations in the neck of the bag.

As best illustrated in FIGS. 2 and 8 of the drawing, a pair of gathering belts 41 and 43 extend around driven rollers 140 and 144 and around a drive roller 145 mounted on shaft 146. Shaft 146 has a pulley 147 mounted on the opposite end thereof and is driven by a belt 25a extending around pulleys 147 and 148. Pulley 148 is mounted on a shaft 25 which drives the upper gathering belt 22 routed around driven pulley 24 and idler pulleys 26, 27 and 28 of the bag neck tying apparatus 10.

Roller 150p has a groove 152p formed in the surface thereof and is driven by a pair of gathering belts 51 and 53 extending around rollers 150, 154 and 155, as illustrated in FIG. 8. Drive roller 155 is mounted on shaft 156 which has a pulley 157 mounted on the end thereof. A drive belt 35a extends around pulley 158 mounted on the end of shaft 35 which drives the lower gathering belt 32 of tyer 10 which extends around driven pulley 34 and pulleys 36, 37 and 38 of the bag tying apparatus 10.

It should be noted that upper gathering belts 41 and 43 and lower gathering belts 51 and 53 grippingly engage the neck of the bag adjacent opposite sides of the segment of the bag that is to be sealed to form sealed strip 130. Teeth 142p on roller 140p are preferably spaced from but adjacent the segment of the neck of the bag between the gathering belts 41 and 43.

It should be readily apparent that roller 140p having teeth formed thereon is driven in synchronized relation with gathering belt 22 through the belt 25a extending around pulleys 147 and 148 and that roller 150p having a groove 152p formed therein is driven in synchronized relation to the lower gathering belt by the drive belt 35a extending around pulleys 157 and 158.

Rollers 140, 144 and 145 are mounted on a mounting plate 149 and rollers 150, 154 and 155 are mounted on a mounting plate 159. The opposite ends of shafts 146 and 156 are supported by mounting plates 149a and 159a.

A top plate 149b has opposite ends secured by screws between mounting plates 149 and 149a and a side plate 149c extends vertically between mounting plates 149 and 149a and generally perpendicular to top plate 149b.

Figure 6:
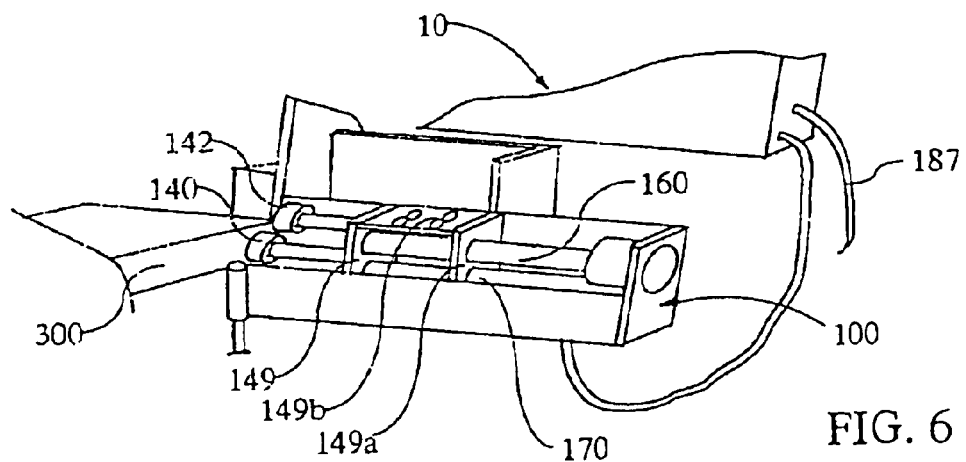
FIG. 6 is a perspective view of the apparatus for forming a tamper resistant seal, the cover being removed to more clearly illustrate details of construction.
Figure 7:
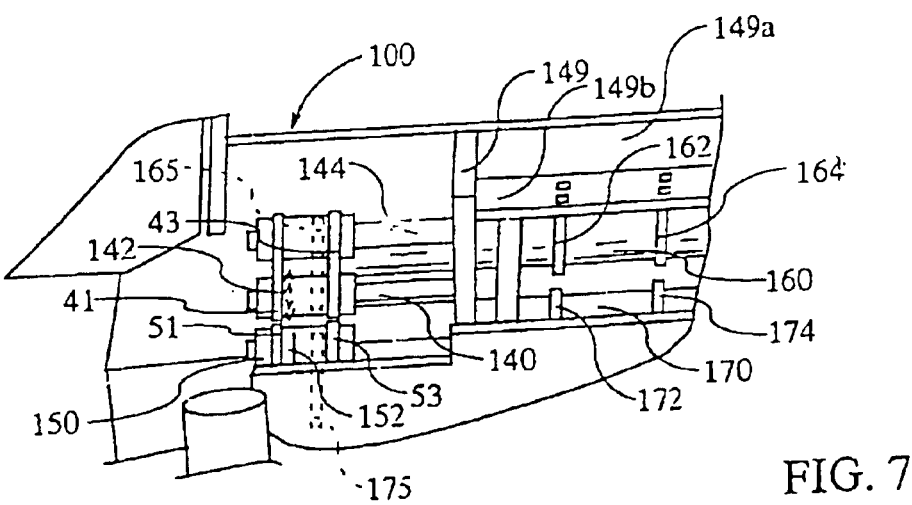
FIG. 7 is an enlarged elevational view showing the relationship of heaters, air manifolds and perforating rollers for forming a tamper resistant seal.

An upper heater 160 is secured by U-bolts 162 and 164 to top plate 149b, as best illustrated in FIGS. 6 and 7 of the drawings. The rear end of the upper heater 160 extends through passage 160a formed in mounting plate 149a.

A lower heater 170 extends through openings formed in mounting plates 159 and 159a and is secured by U-bolts 172 and 174 to a bottom mounting plate 159b adjacent a vertically extending mounting plate 159c.

Heated air is delivered from heater 160 into an upper manifold 165 and heated air is delivered from heater 170 into a lower manifold 175.

Manifolds 165 and 175 preferably have elongated orifices formed therein which form a row of jets of air which are projected to impinge against the surface of the neck of a bag moving between manifolds 165 and 175. The temperature and volume of air is selected to deliver sufficient heat for fusing panels of the bag together to form seal strip 130.

It should be appreciated that the projection of jets of heated air to impinge against the surface of the bag allows panels of the bag to be fused without physically contacting surfaces of the bag with heated sealing elements. Thus, even though the neck of the bag may carry wet ink which has not cured, or ink softened by the heat, seal strip 130 can be formed thereon. Wet or softened ink will not offset onto manifolds 165 and 175 because the manifolds do not physically engage surfaces of the neck of the bag.

Air manifolds 165 and 175 preferably have for example twenty orifices about 0.040 inches arranged to form outlet openings which project air streams to impinge against panels 125x and 125y above and below the neck 125 of each bag for heating panels 125x and 125y to a temperature sufficient for fusing panels 125x and 125y together to form the seal strip 130.

Heaters 160 and 170 preferably electrically heat air flowing therethrough delivered from an air supply line 180 through a pressure regulator 182, filter 184 and feed line 185, as illustrated in FIG. 2 of the drawing. Air feed line 185 preferably passes through a control valve 186 for controlling the pressure and volume of air delivered through line 187 to heaters 160 and 170. The heater mount for the lower 170 is substantially a mirror image of the heater mount for heater 160 and heaters 160 and 170 are mounted on a frame to permit separation of rollers 140 and 150 in the event that a heel on a loaf of bread in bag 125 falls down into the nip between rollers 140 and 150. Roller 140 is spring urged downwardly toward roller 150 but can pivot upwardly if necessary to allow a heel or other obstruction to pass through the nip between rollers 140 and 150.

Each heater 160 and 170 is preferably provided with an electric heating element connected through a thermostat which is adjustable for controlling the temperature of air delivered from heaters 160 and 170 to manifolds 165 and 175. Further, thermocouples are mounted in manifolds 165 and 175 to indicate the temperature of air supplied by heaters 160 and 170 for assuring that the temperature is maintained in a predetermined range.

As shown in the table of FIG. 11, the air temperature required for forming seal strip 130 varies depending upon the thickness and composition of the material used for forming bag 125 and the speed of conveyor 300 moving the neck of the bag between manifolds 165 and 175. As the thickness of the bag increases the temperature of air delivered through air manifolds 165 and 175 generally increases. As the speed of the conveyor increases the temperature of the air is increased to deliver a controlled volume of air and heat through manifolds 165 and 175 for forming seal strip 130.

Air supplied through pressure regulator 182 is preferably about 25 psi and heaters 160 and 170 are preferably selected to heat the volume of air flowing through manifolds 165 and 175 to a maximum temperature of for example 600° F. The thermocouples provide a read out of temperature of air flowing through manifolds 165 and 175 and the temperature of air delivered through the heaters 160 and 170 is adjustable to provide the desired quantity of heat for forming seal strip 130.

The wire tying device, generally designated by the numeral 10 in FIGS. 1 and 2 of the drawing, forms no part of the invention claimed herein except in combination with the apparatus for forming a tamper resistant closure. The wire tying device generally comprises upper and lower gathering belts 22 and 32, the upper gathering belt 22 being driven by a pulley on a shaft 25 and the lower gathering belt 32 being driven by a pulley on a shaft 35, as described in U.S. Pat. No. 5,483,134. As noted above, movement of rollers in the apparatus for forming a tamper resistant closure are synchronized with the rotation of shafts 25 and 35 through belts 25a and 35a.

The upper and lower gathering belts 22 and 32 move bags 125 along a path to a position adjacent a needle assembly, a twister hook assembly and a holder-shear assembly (not shown) for wrapping a wire-like tie around a gathered neck of the bag 120.

Terms such as "horizontal," "vertical," "up," and "down" when used in reference to the drawings, generally refer to the orientation of the parts in the illustrated embodiment and not necessarily in the described orientation during use.

SECOND EMBODIMENT

A second embodiment of the apparatus for forming a tamper resistant closure on the neck of a bag is illustrated in FIGS. 12 through 19. The parts of the apparatus are substantially the same as that of the first embodiment except that certain parts and operations have been rearranged.

Figure 16:
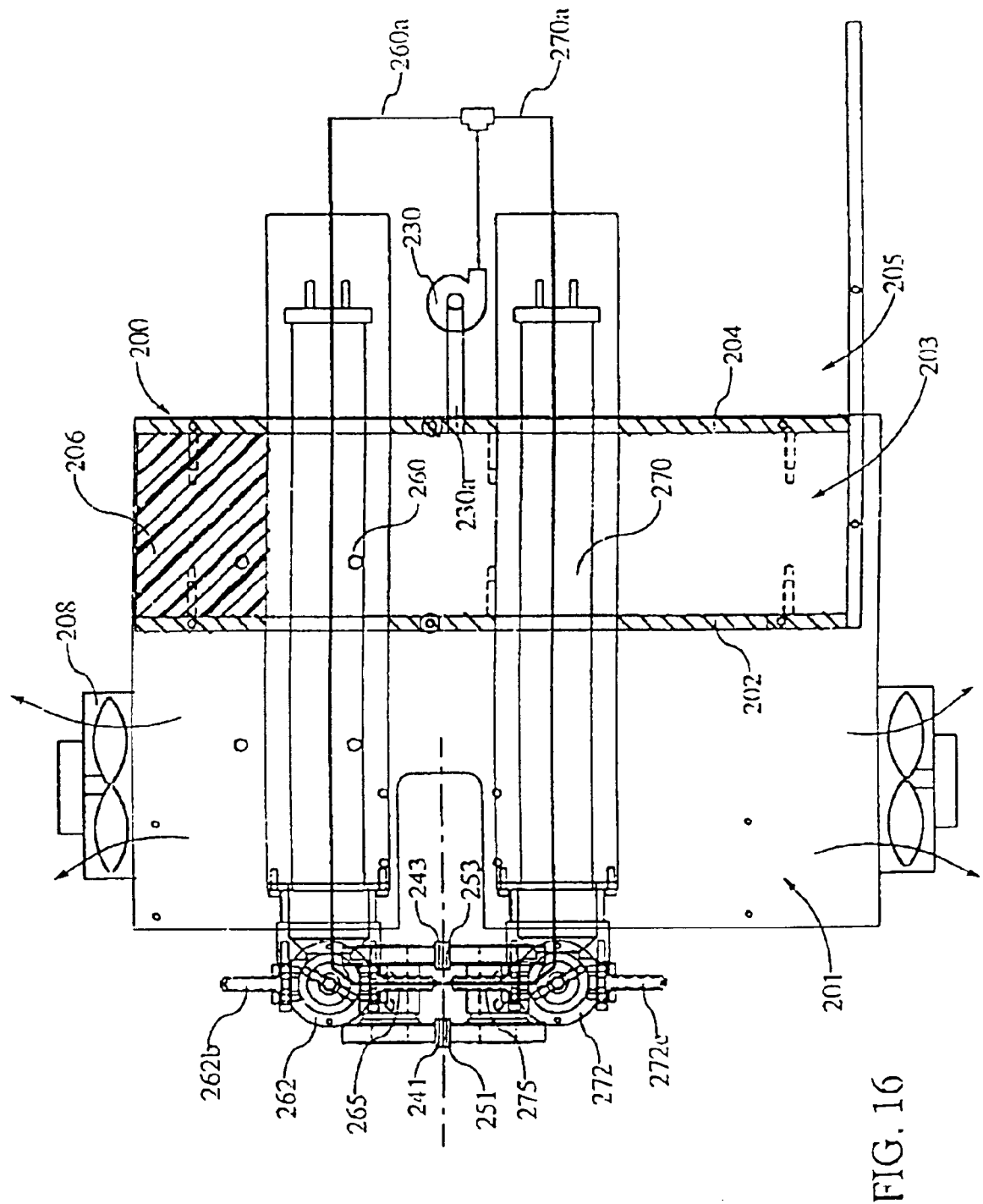
FIG. 16 is a diagrammatic view of the heater and manifold assemblies with the belt assemblies in the position of FIG. 12 and 14.
Figures 18, 19:
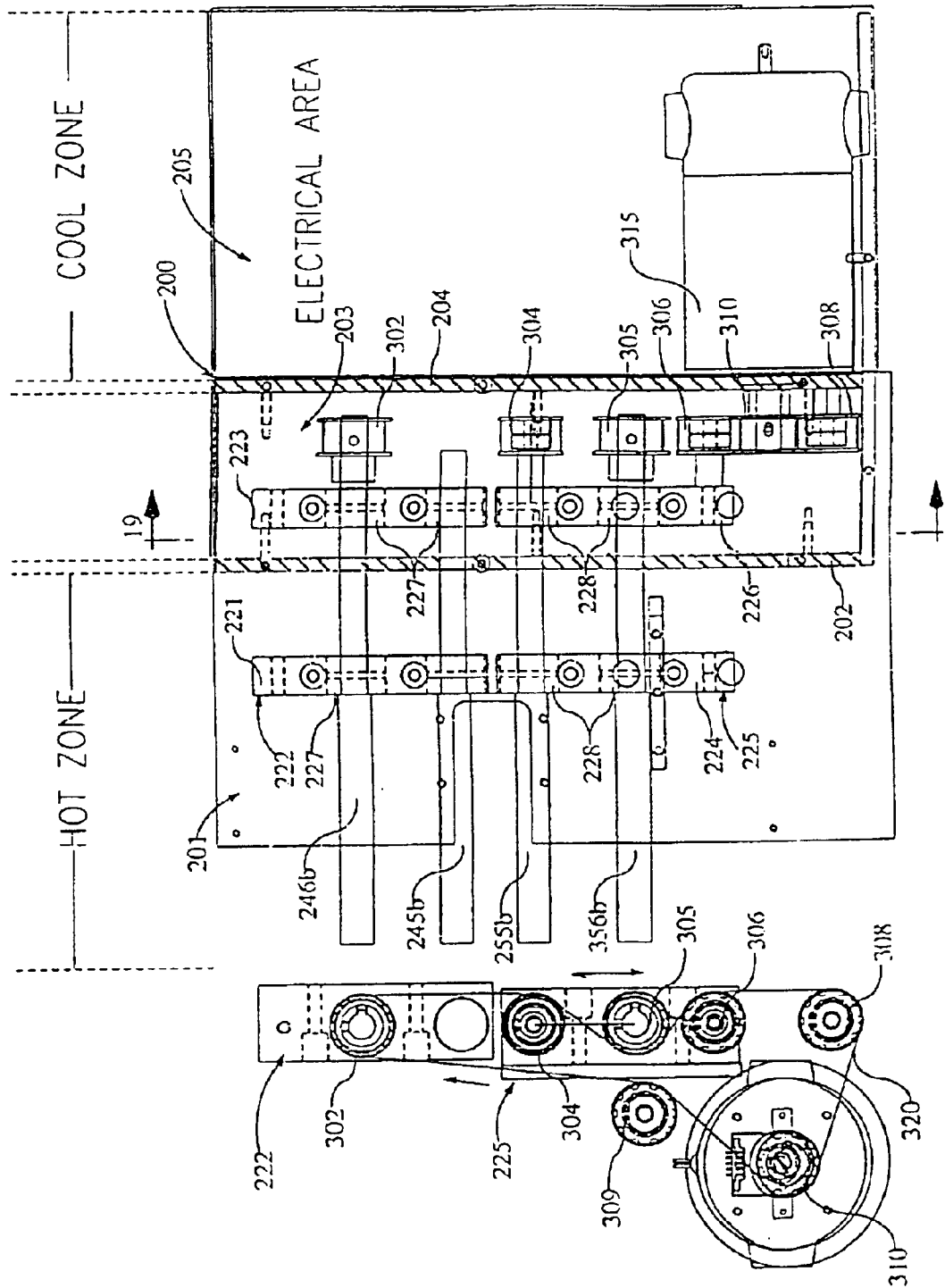
FIG. 18 is a diagrammatic side elevational view.
FIG. 19 is a diagrammatic view taken substantially along lines 19—19 of FIG. 18.

Referring to FIGS. 16 and 18, a heater housing 200 has partition walls 202 and 204 mounted between end walls for forming a hot zone 201, and intermediate zone 203 and a cool zone 205 in the heater housing 200. An air filter is mounted in the intermediate zone 203 for cleaning air drawn through the intermediate zone by a blower 230 in the cool zone 205 for delivering air to heaters 260 and 270. Exhaust fans 208 are mounted in the hot zone 201 for exhausting spent air from heater housing 200, as will be hereinafter more fully explained.

Figure 12:
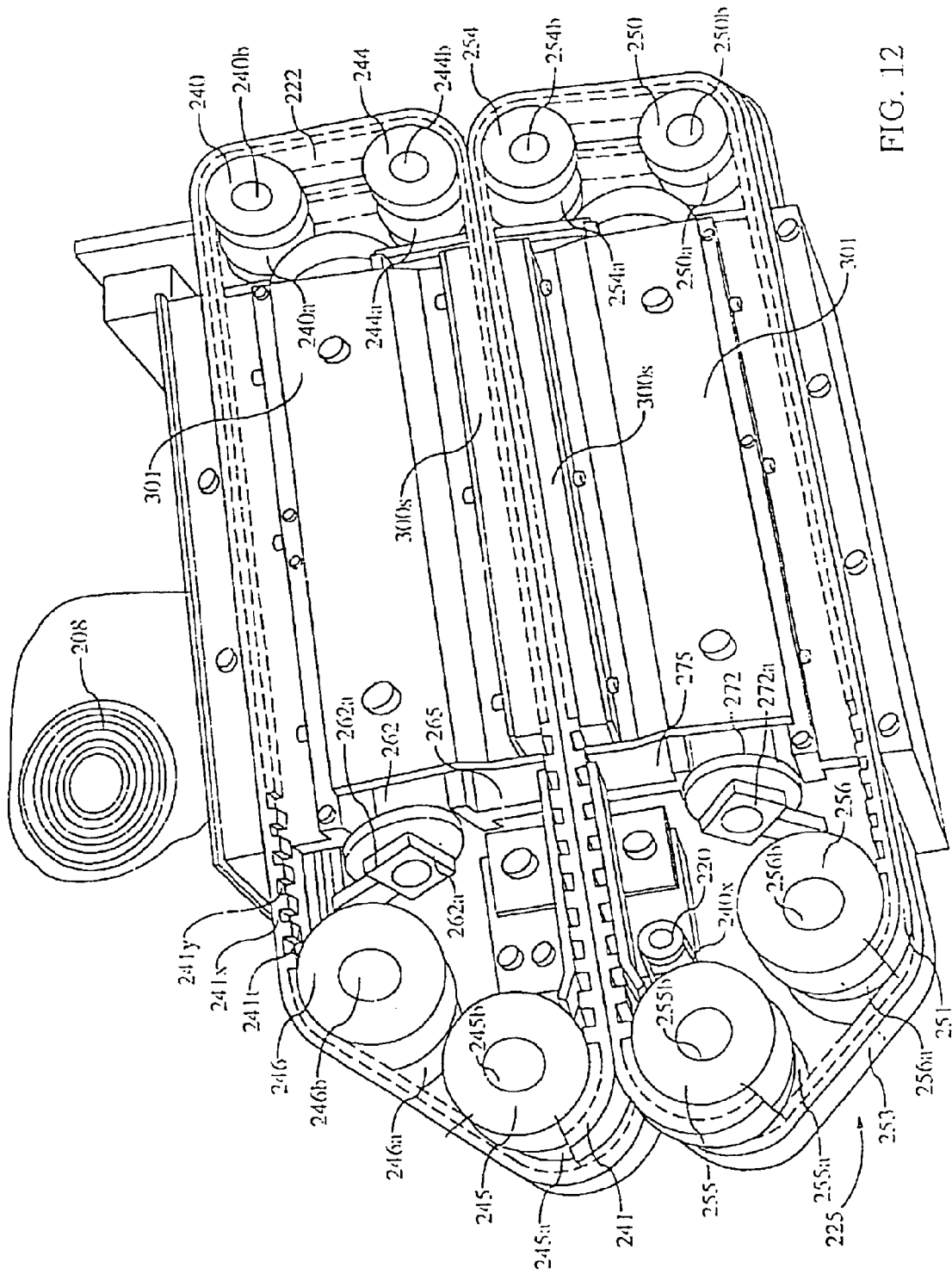
FIG. 12 is a perspective view of the belt assembly in an operative position.

Referring to FIGS. 12 and 18 of the drawing, outboard upper gathering belt 241 and inboard upper gathering belt 243 are mounted on an upper chassis 222 and outboard lower gathering belt 251 and inboard lower gathering belt 253 are mounted on a lower chassis 225.

Figure 13:
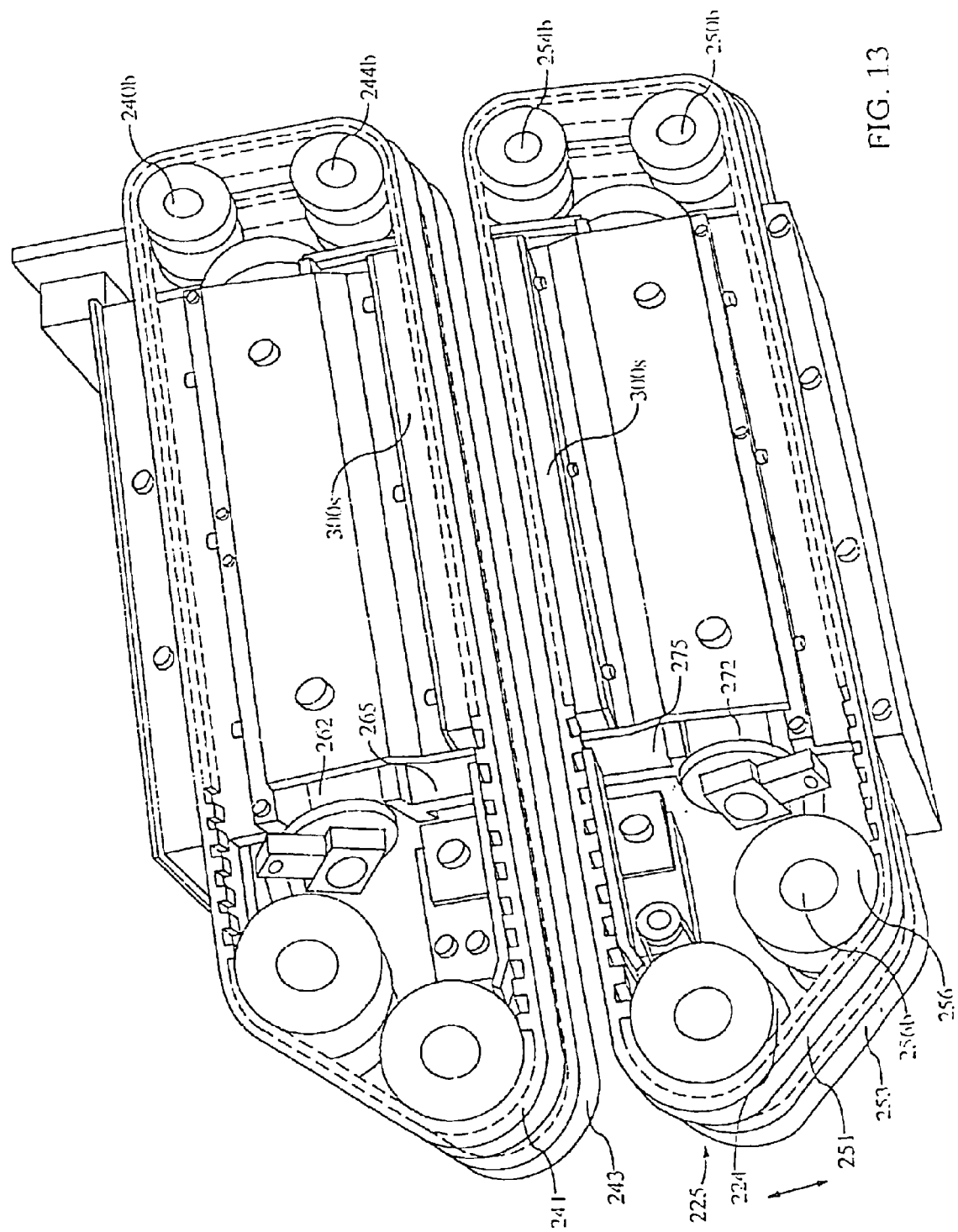
FIG. 13 is a view similar to FIG. 12 with the lower drive belt chassis in a lowered position.
Figure 14:
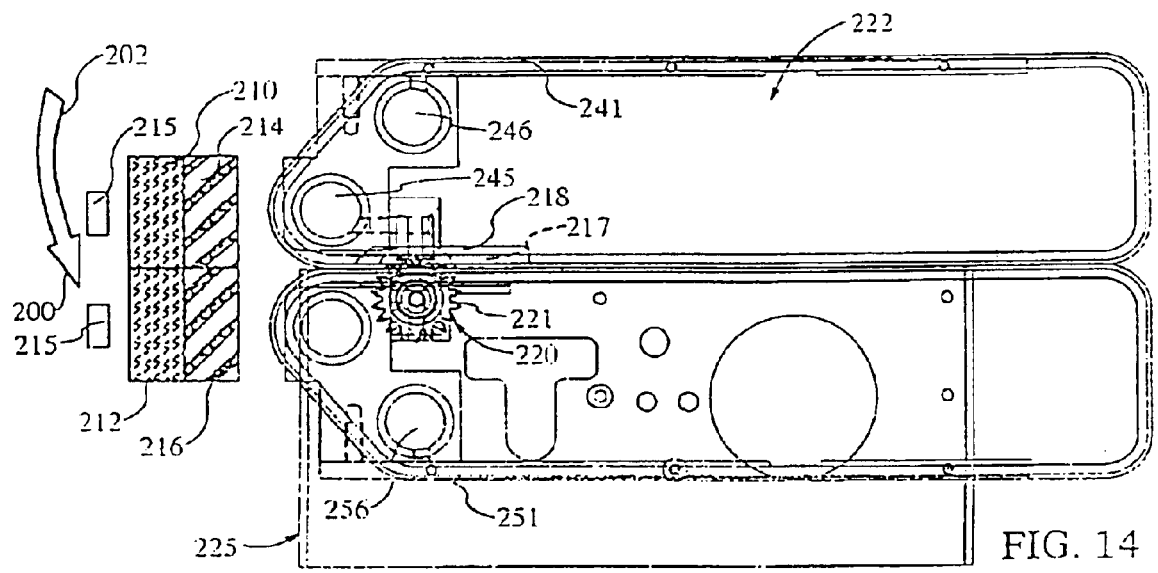
FIG. 14 is a diagrammatic view with the belts in the position illustrated in FIG. 12.

The lower chassis 225, carrying belts 251 and 253 is movable from the position illustrated in FIG. 12 to the position illustrated in FIG. 13, if capacitive sensor 215, best illustrated in FIG. 14, detects a heel or other obstruction has fallen into the neck of the bag. After the heel or other obstruction has been removed, the system is reset and the lower chassis 225 moves back to the position illustrated in FIG. 12.

The outboard upper gathering belt 241 extends around outer timing belt pulleys 240, 244, 245 and 246. The inboard upper gathering belt 243 extends around pulleys 240a, 244a, 245a and 246a. Pulleys 240 and 240a are mounted on a shaft 240b, pulleys 244 and 244a are mounted on a shaft 244b, pulleys 245 and 245a are mounted on a shaft 245b and pulleys 246 and 246a are mounted on a shaft 246b.

As best illustrated in FIG. 18, the upper chassis 222 is formed by spaced plates 221 and 223 bolted or otherwise secured between end walls. In the illustrated embodiment the upper chassis is not movable and shafts 240b–246b are supported in bearings 227 mounted in the spaced plates 221 and 223.

The outboard lower gathering belt 251 extends around outer pulleys 250, 254, 255 and 256. The inboard lower gathering belt 253 extends around pulleys 250a, 254a, 255a and 256a. Pulleys 250 and 250a are mounted on a shaft 250b, pulleys 254 and 254a are mounted on a shaft 254b, pulleys 255 and 255a are mounted on a shaft 255b and pulleys 256 and 256a are mounted on a shaft 256b. The lower chassis 225 is formed by spaced plates 224 and 226 bolted or otherwise secured between slide plates which move vertically relative to the end walls. In the illustrated embodiment the lower chassis is movable and shafts 250b–256b are supported in bearings 228 mounted in the spaced plates 224 and 226. As will be hereinafter more fully explained, the bearings 227 and 228 are spaced inwardly from the timing pulleys 240–256b and manifolds 265 and 275 a distance sufficient to prevent excessive heating of the bearings 227 and 228 by spent air drawn vertically through the hot zone 201 in heater housing 200 by exhaust fans 208.

The perforator wheel 220 is driven by a belt 240x which extends around a hub on the perforator wheel and is driven by a pulley (not shown) on shaft 255b.

An air nozzle 209, illustrated in FIG. 14, is connected to a flexible tube 209a through which air is delivered from an air compressor (not shown) or other suitable source of compressed air to form a jet which flattens the neck of the bag and positions it to enter the nip between a first pair of brushes 210 and 214 positioned above the edge of the conveyor and a second pair of brushes 212 and 216 positioned below the edge of the conveyor. The air jet pushes side 12x of bag 12a toward side 12y of bag 125a.

Figure 15:
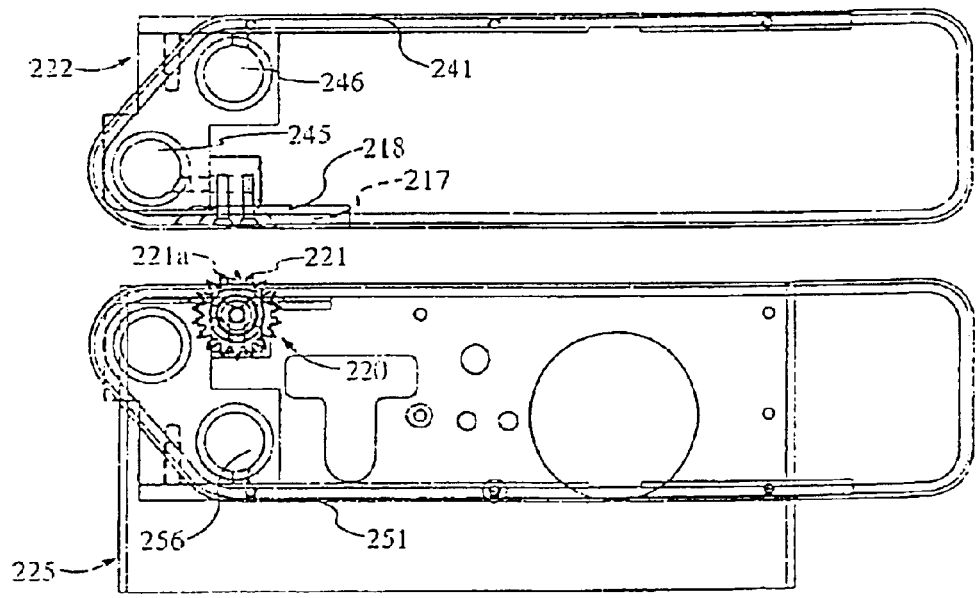
FIG. 15 is a diagrammatic view with the belt assemblies in the position illustrated in FIG. 13.
Figure 17:
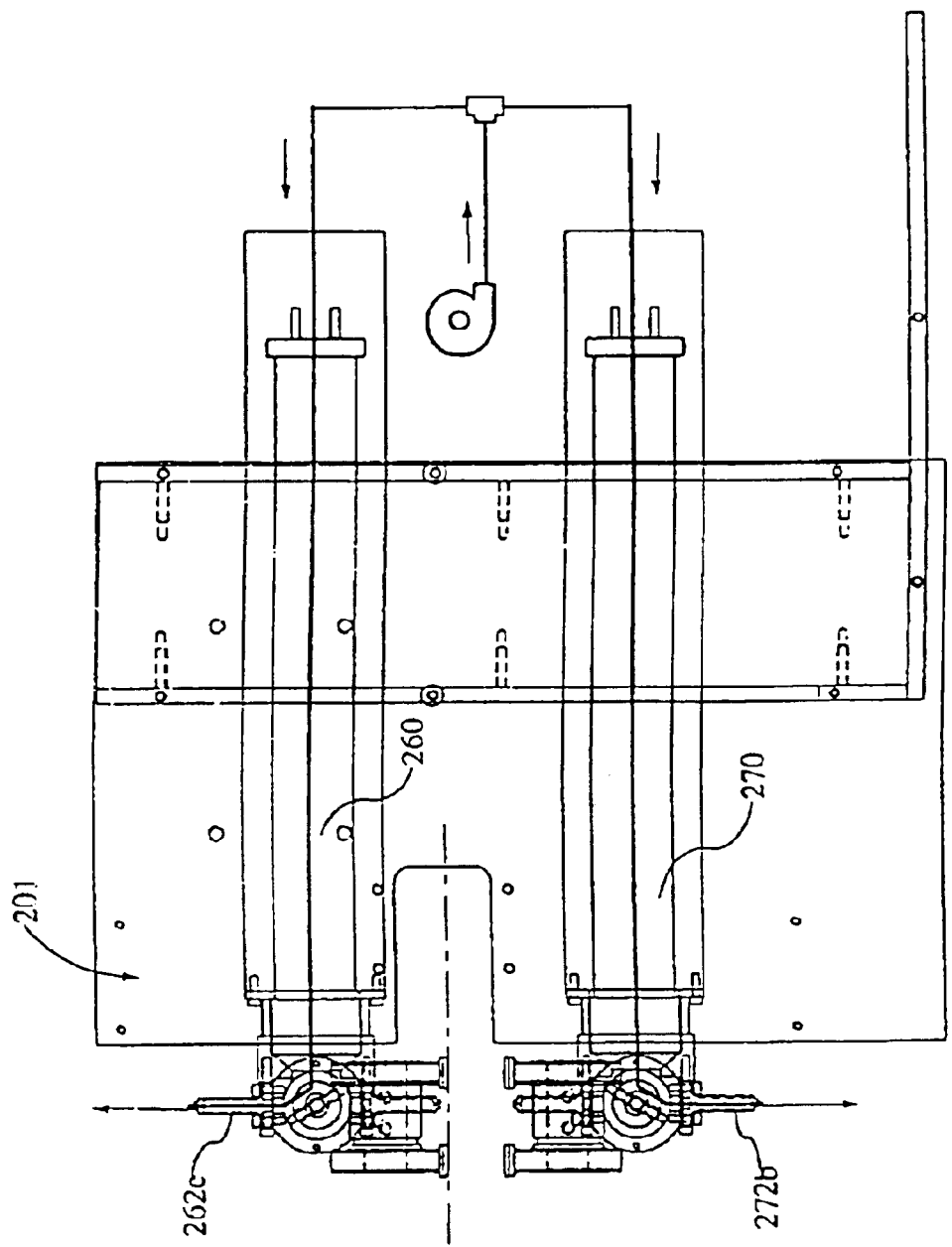
FIG. 17 is a diagrammatic view similar to FIG. 16 with the belt assemblies in the position of FIGS. 13 and 15.

A capacitive sensor 215 is positioned between the air nozzle 209 and brushes 210–216 for sensing when a heel of a loaf of bread has fallen down into the neck of the bag. If a heel or other obstruction has fallen down into the neck of the bag, the sensor sends a signal to stop the conveyor and actuate the sealing apparatus to the non-operable position, as shown in FIGS. 13, 15 and 17. The sensor 215 is a capacitor type sensor which senses a change in mass adjacent the sensor out of a predetermined range.

If the bag neck is unobstructed, the neck of the bag moves between upper and lower pairs of brushes. First upper and lower brushes 210 and 212, best illustrated in FIG. 14, have stiff bristles and rotate in opposite directions such that the lower surface of the upper brush 210 and the upper surface of the lower brush 212 move in the same direction and engage the neck of the bag to draw the bag laterally across the conveyor until the contents of the bag engage guide bars which limit lateral movement of the bag when the contents of the bag move to engage the guide bars. The sweeping action of the first upper and lower brushes 210 and 212 draws the bag taut around the contents of the bag.

The second upper and lower brushes 214 and 216 have spaced rows of angular bristles which are slightly longer than the bristles of the first upper and lower brushes 210 and 212 for moving the leading edge of the neck of the bag away from the trailing edge to flatten the neck of the bag and to evacuate air from the bag before it is sealed. The angularly disposed bristles are preferably about ⅛ inch larger in diameter than the bristles on the first upper and lower brushes 210 and 212.

It should be readily apparent that the first pair of upper and lower brushes 210 and 212 draw the bag around the product while the second pair of upper and lower brushes 214 and 216 flatten the bag neck, evacuate air from the inside of the bag and position the leading edge of the bag neck between upper belts 241 and 243 and lower belts 251 and 253. The first set of brushes 210 and 212 which move the neck of the bag laterally across the conveyor tend to resiliently hold and resist movement of the neck of the bag longitudinally of the conveyor by the second pair of upper and lower brushes 214 and 216 and the gathering belts. Thus the leading edge of the neck of the bag is gripped by the gathering belts and the trailing edge is pulled from between the brushes so that the neck of the bag is smoothed as it is drawn between the gathering belts and the portion of the neck of the bag that bridges the space between horizontally spaced belts 241 and 243 is substantially planar.

As illustrated in FIGS. 14 and 15, the perforating assembly is formed by a perforator wheel 220 having teeth 221 spaced around its periphery positioned below the neck of the bag and an anvil 218 having a slot 217 formed therein above the neck of the bag. The neck of the bag is held taut between lower surfaces of belts 241 and 243 and upper surfaces of belts 251 and 253.

Each tooth 221 on the perforator wheel 220 is shaped to make a defined cut or elongated slot in the portion of the bag neck bridging between the belts. An area 221a of defined length is formed between adjacent teeth 221 on the perforator wheel 220 to leave spaced areas on the neck of the bag which are not cut. The perforator wheel 220 is driven by a pair of belts in synchronized relation with the belts moving the bag so that every bag moving adjacent the perforator wheel is substantially identical.

The perforator wheel 220 is mounted on a stub shaft secured in a bearing to the lower belt chassis 225. Teeth on the perforator wheel extend into the slot on the lower surface of the anvil carried by the upper chassis 222 such that the bag is supported by flat surfaces adjacent opposite sides of the perforator wheel.

Referring to FIG. 12 of the drawing, upper gathering belts 241 and 243 are mounted on an upper chassis 222 and lower gathering belts 251 and 253 are mounted on a lower chassis 225, as herein before described. The lower chassis 225, carrying belts 251 and 253 is movable from the position illustrated in FIG. 12 to the position illustrated in FIG. 13, if capacitive sensor 215 detects a heel which has fallen into the neck of the bag. After the heel or other obstruction has been removed the system is reset and the bottom chassis moves back to the position illustrated in FIG. 12. The perforator wheel 220 is driven by a belt 240x which extends around a hub on the perforator wheel and is driven by a pulley (not shown) on shaft 255b.

Referring to FIGS. 18 and 19 of the drawing, shaft 240b which carries pulleys 240 and 240a and shaft 255b having pulleys 255 and 255a mounted thereon, are driven by a belt 320 routed around pulleys as illustrated in FIG. 19 of the drawing. The upper pulley 302 is mounted on the end of shaft 246b. Shaft 245b is an idler shaft and does not have a pulley mounted on the rear end thereof.

A pulley 304 is mounted on shaft 255b for driving timing belt pulleys 254 and 254a. Pulley 305 is mounted on shaft 256b for driving timing belt pulleys 350 and 350a. Idler pulley 306 is mounted on a stub shaft carried by the lower chassis 225.

A direct current driven motor 315 is electrically connected to a suitable driver, such as the output from the tyer or a decoder module on the conveyor for driving belts 241, 243, 251 and 253 at a speed equal to the surface speed of the conveyor 300. Motor 315 has a drive pulley 310 mounted on the drive shaft for driving belt 320 which extends around an idler pulley 309, pulley 302 for driving upper belts 341 and 343, around drive pulley 304, idler pulley 305 and drive pulley 306 for driving shafts 246b and 256b, and around pulley 308.

The upper chassis 222 carrying the upper belts 241 and 243 is stationary. The lower chassis 225, carrying belts 251 and 253 can be moved vertically, as illustrated in FIG. 19, for moving the lower chassis 225 to an off position for separating the upper and lower pairs of belts. Referring to FIG. 19, it should be readily apparent that when chassis 225 moves downwardly, the length of drive belt 320 is unchanged since pulleys 304, 305 and 306 rotate and advance along belt 320 as chassis 225 moves vertically. Thus, the belt tension is not changed.

Referring to FIG. 16 of the drawing, a three-stage blower 230 delivers a high volume of pressurized air to electric heaters 260 and 270. Heaters 260 and 270 are preferably configured to circulate the air over heating elements for heating the air to a controlled temperature and delivering the air through diverter valves 262 and 272, respectively, to upper manifold 265 and lower manifold 275. Each manifold 265 and 275 has an elongated slot through which heated air is delivered to impinge against the flattened surface of the neck of the bag bridging space between outboard belts 241 and 251 and inboard belts 243 and 253. It should be appreciated that the perforator wheel 220 has already formed row 132 of perforations in the neck of the bag before the neck of the bag moves between upper and lower manifolds 265 and 275. This assures that the bag is perforated while it is cool and before it is heated to the point at which it might tend to stretch and deform when teeth 221 on the perforator wheel 220 engage the neck of the bag. The heated air, flowing at a high velocity, impinges against upper and lower surfaces of the neck of the bag for welding the upper and lower surfaces together. It should be appreciated that air impinges against the portion of the bag bridged between the belts such that the molten plastic or any ink which may be softened by the hot air is not offset onto the belts or any other mechanism before the neck of the bag is cooled.

Upper and lower diverter valves 262 and 272 are provided with spring-loaded paddles which are rotated by air cylinders from the position illustrated in FIG. 16 to the position illustrated in FIG. 17 when the lower chassis 225 is actuated to an inoperable position. This causes the heated air to be diverted away through exhaust ports from the neck of any bag which might be positioned adjacent the manifolds 265 and 275 when the lower chassis 225 is actuated downwardly. Diverting the air, as illustrated in FIG. 17 also directs the air away from the vicinity of the belts to assure that the belts are not overheated.

As best illustrated in FIG. 16, the three stage blower 230 has an intake line 230a extending through partition wall 204 for drawing air from the intermediate zone 203 through air filter 206. Air is discharged by blower 230 through lines 260a and 270a into heaters 260 and 270. Air preferably is delivered along a plurality of paths through heaters 260 and 270 to diverter valves 262 and 272. When the spring-loaded paddles are in the position illustrated in FIG. 16, air is delivered through manifolds 265 and 275 to impinge against the upper and lower surfaces of the neck of the bag bridging between the inboard and outboard belts. When levers 262a and 272a are rotated, the spring-loaded paddles are moved from the position illustrated in FIG. 16 to the position illustrated in FIG. 17 for delivering air through exhaust ports 262e and 272e into the hot zone 201 and the air is evacuated from the hot zone 201 by exhaust fans 208 mounted at upper and lower ends of the hot zone 201.

Diverter valves 262 and 272 positioned immediately adjacent manifolds 265 and 275 allows the air to be diverted quickly from the manifolds to the exhaust ports and back to the manifolds. Since heated air flows continuously through diverter valves 265 and 275, the mechanism does not deviate in temperature and does not require warm-up periods when the paddle is moved from one position to the other.

The provision of an intermediate zone 203 between the hot zone 201 and the cool zone 205 effectively isolates the hot zone 201 from the cool zone 205 where the electrical controls and blower 230 are located. Further, drawing air through filter 206 adjacent partition wall 202 pre-heats air drawn into blower 230.

The three stage blower 230 is configured to deliver a high volume of relatively high pressure air through the heaters and manifolds 265 and 275. The continuous regulated supply of air through heaters 260 and 270 over heating elements assures that the air temperature and volume is maintained within parameters to assure that bag necks will be sealed as they move between manifolds 265 and 275 while assuring that excessive heat is not delivered. Heating elements in heaters 260 and 270 are thermostatically controlled to accommodate bags constructed of different materials and made of plastic of different thicknesses.

It is important to note that brushes 210, 212, 214 and 216 are configured for flattening the neck of the bag and evacuating excess air from the inside of the bag so that the row 132 of perforation and seal strip 130 can be formed consistently on bag necks.

The belts are preferably timing belts which have teeth 241t undercut or shortened to permit edges of the belt to extend beyond flanges on the timing belt pulleys 240–256a carrying the belts. This assures that the neck of the bag will not wrap around and be pinched between the belt and the flanges on the timing belt pulleys. A layer of soft pliable material 241x is vulcanized onto the outer surface of each belt body 241y to provide a relatively hard durable surface which is in engagement with the timing belt pulleys and to provide a relatively soft pliable surface on each belt which engages the neck of the bag. This causes the belts to grip the bag to minimize slippage as the neck of the bag is moved adjacent the perforator wheel 220 and between upper and lower manifolds 265 and 275 where seal strip 130 is formed.

Teflon reinforced slider plates 300s are secured to mounting plates 301 bolted or otherwise secured to the upper and lower chassis 222 and 225. Belts spanning space between pulleys 344 and 345 and between pulleys 354 and 355 engage slider plates 300s which prevent deflection of the belts to assure that the belts firmly grip spaced portions of the bag neck adjacent opposite sides of upper and lower manifolds 265 and 275.

As best illustrated in FIG. 12 of the drawing, diverter valves 262 and 272 have levers 262a and 272a extending outwardly therefrom which are engaged by a turnbuckle on the rod of a cylinder for actuating spring loaded paddles in the diverter valves from the position illustrated in FIG. 16 to the position illustrated in FIG. 17.

THIRD EMBODIMENT

Figure 21:
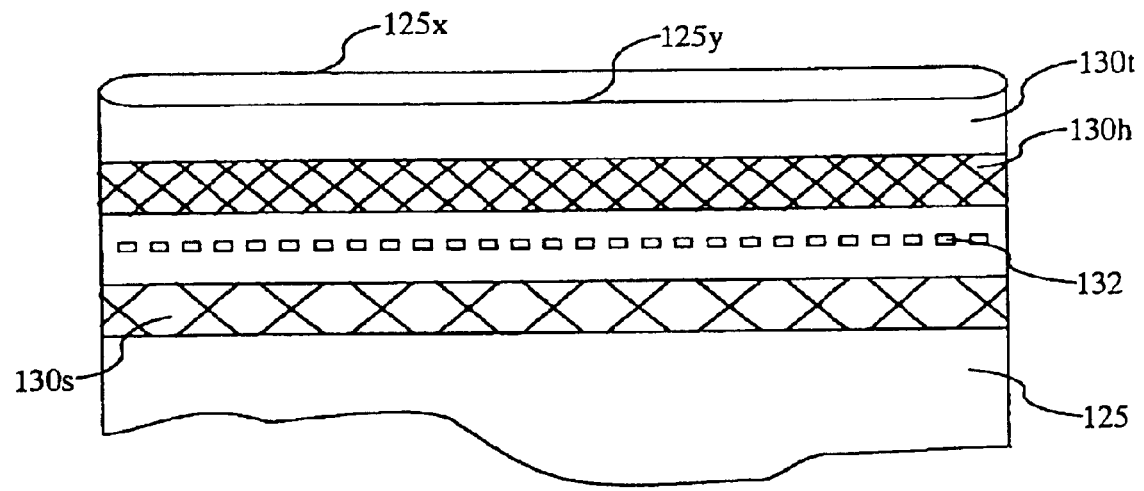
FIG. 21 is a fragmentary diagrammatic view of hard and soft seal strips and a row of perforations formed on the neck of a bag of the third embodiment.
Figure 20:
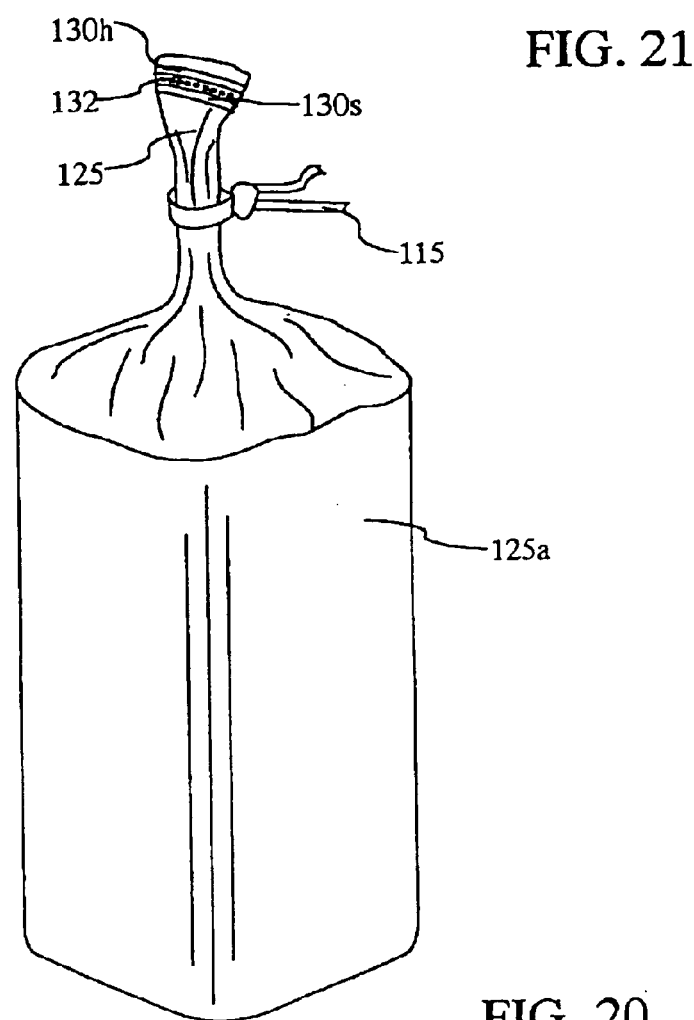
FIG. 20 is a perspective view of a bag showing the relationship of the seal strip, row of perforations and removable closure of the third embodiment.
Figure 22:
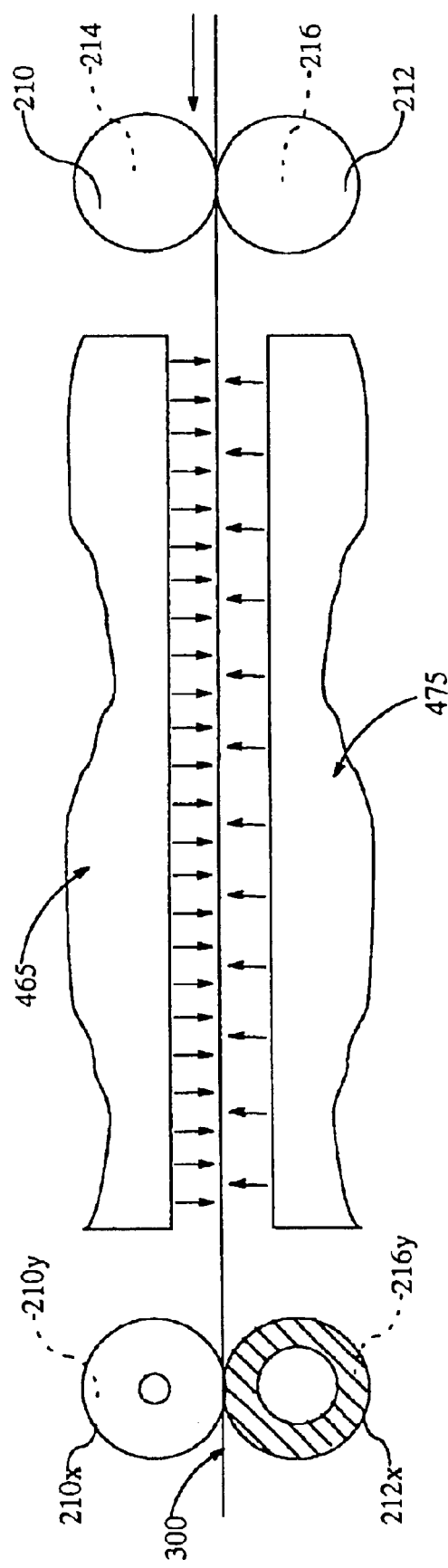
FIG. 22 is a diagrammatic view similar to FIG. 1 of the third embodiment.

The bag illustrated in FIGS. 20 and 21 of the drawing is substantially the same as that illustrated in FIGS. 9 and 10 of the drawing, except that a hard seal strip 130h and a soft seal strip 130s are form adjacent opposite sides of row 132 of perforations. The illustrated tamper evident bag closure system provides a double sealed tail 130t, a perforated seam 132 between the seals 130h and 130s for removing the hard seal 130h and to permit opening the bag 125 by separating the soft seal 130s, and a twist tie closure 115 for easy opening, re-closing, and maintaining freshness of the contents of the bag. FIG. 22 is a diagrammatic view similar to FIG. 1 of the third embodiment which includes upper and lower manifolds 465 and 475, respectively, positioned above and below conveyor 30. Upperbrushes 210 and 214 and lowerbrushes 212 and 216 are positioned to flatten the tail 130 of a bag prior to the perforating step as heretofore described in connection with the first and second embodiments. After the neck of the bag has moved between upper and lower manifolds 465 and 475, while the plastic material is still soft, it is moved between knurled rollers 210x and 210y above conveyor 30 and resilient covered rollers 212x and 216y below conveyor 30. Resilient rollers 212x and 216y have a sleeve of silicone. The nurreled surfaces on rollers 210x and 210y urge the tail 130t into pressure engagement with the resilient surfaces on rollers 210x and 216y while the plastic is still hot to provide and improved seal under certain operating conditions.

Figure 23:
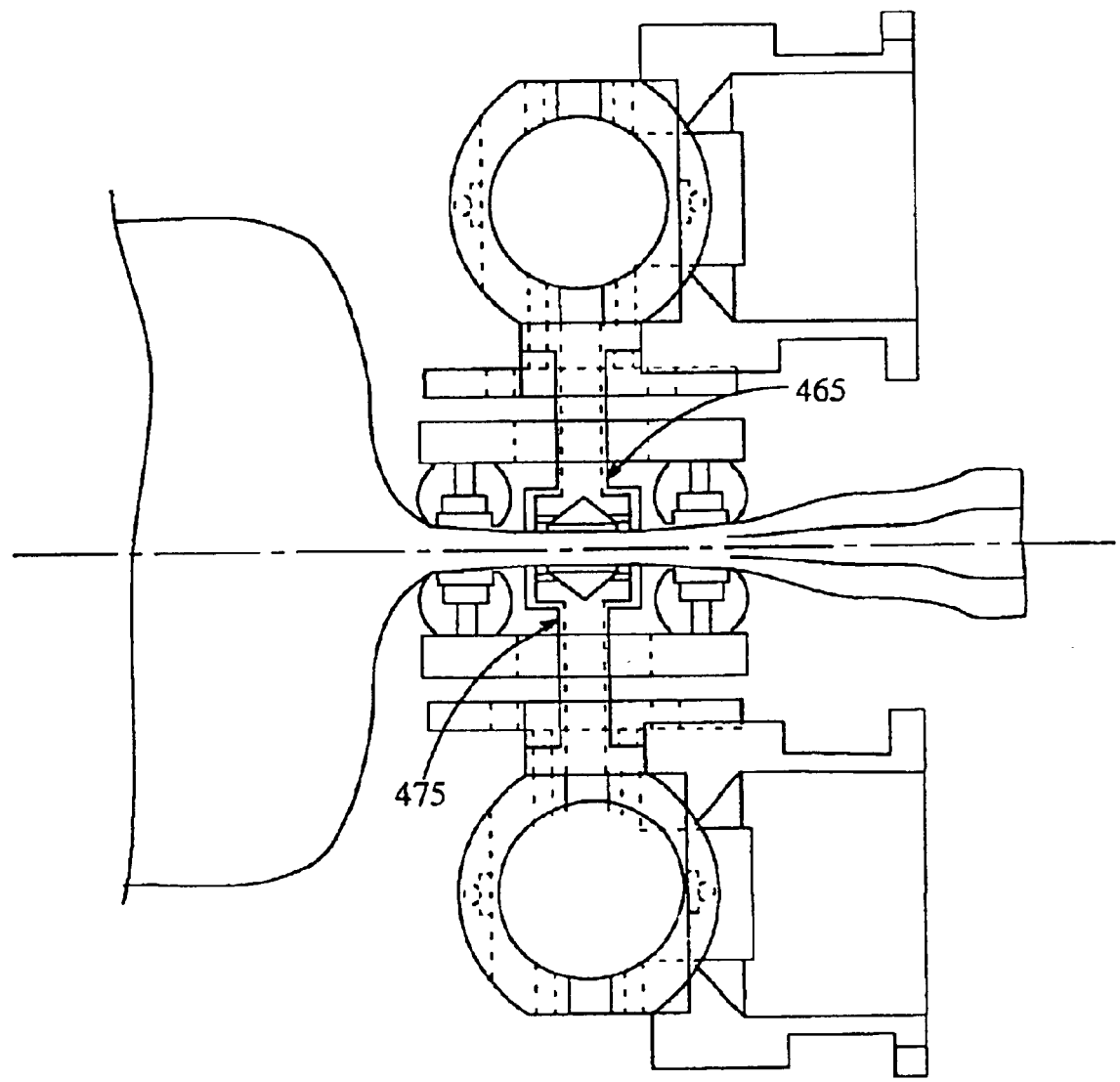
FIG. 23 is an end view of the assembled third embodiment.
Figure 24:
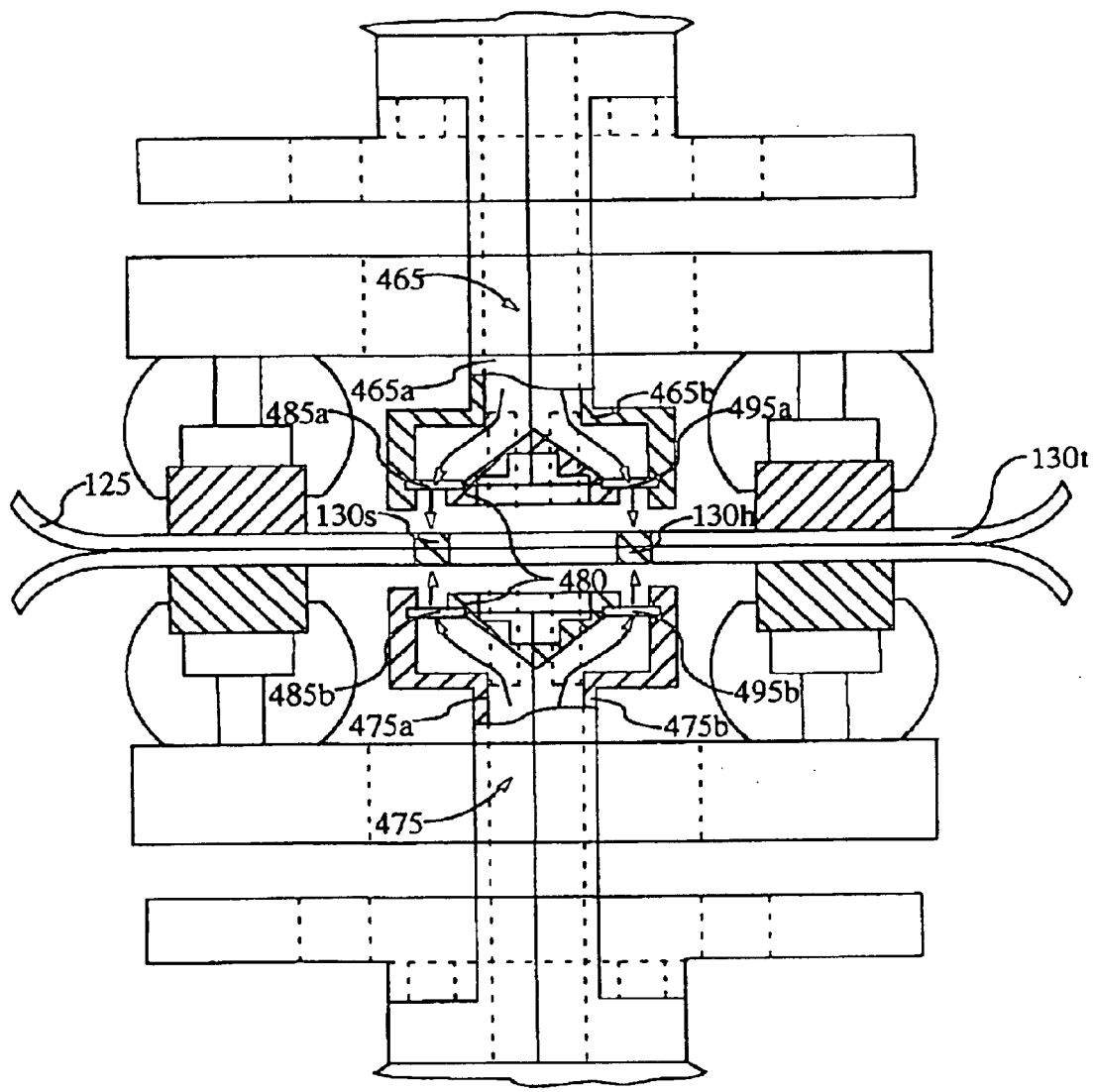
FIGS. 24–30 illustrate upper and lower manifolds.
Figure 26:
Figure 25:
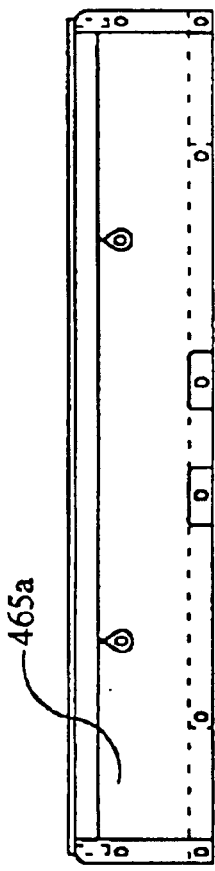
Figure 27:
Figures 28, 29:
Figure 30:
Figure 31:
FIGS. 31–35 illustrate a split manifold cap.
Figure 32:
Figure 33:
Figure 34:
Figure 35:

As best illustrated in FIGS. 23–30, upper and lower manifolds 465 and 475 are formed of split manifold tips 465A, 465b, 475a and 475b assembled as illustrated in FIGS. 23 and 24.

FIG. 23 is an end view of an assembled third embodiment of the manifold configured for forming first and second seal strips adjacent opposite sides of a row of perforations such that a first hard seal can be torn from the bag when the bag is torn along the row of perforations. The second seal is a soft seal which can be pulled apart for accessing the contents of the bag. A primary function of the second or soft seal is to assure that the contents of the bag remain fresh and to prevent contamination. In some localities, small insects enter bags of food products through unsealed portions of the bag. The second soft seal prevents entry of insects into the bag but is formed to permit flaps of the bag to be separated along the soft seal.

As best illustrated in FIGS. 23 and 24, a split manifold cap 480 (illustrated in FIGS. 31–35) is positioned between manifold tips 465a and 465b illustrated in FIGS. 25–30, and between manifold tips 475a and 475b. Upper and lower orifice plates 485a and 485b are positioned to span the gaps between manifold tips 465a and manifold cap 480 and between tip 485b and cap 480 above and below the bag neck for forming soft seal strip 130s. Orifice strips 485a and 485b are preferably about ⅛ inch wide and about 7½ inches or 8 inches long. A row of for example about 30 or 40 orifices having a diameter of about 0.030 inches is formed in each orifice plate 485a and 485b. Jets of air blowing from the upper manifold 465 and jets of air flowing from the lower manifold 475 impinge against upper and lower surfaces of the neck of the bag for bonding the plastic to form soft seal 130s.

As best illustrated in FIGS. 23, 24 and 31–35, a split manifold cap 480 is positioned between manifold tips 465a and 465b and between manifold tips 475a and 475b, as illustrated in FIG. 24 of the drawing. Upper and lower orifice plates 495a and 495b are positioned to span the gaps between manifold tips 465a and manifold cap 480 and between tip 475b and cap 480 above and below bag neck for forming hard seal strip 130h. Orifice strips 495a and 495b are preferably about ⅛ inch wide and about 7½ inches or 8 inches long. A roll of about 60 or 70 orifices having a diameter of about 0.030 inches is formed in each orifice plate 495a and 495b. Jets of air blowing from the upper manifold 465 and jets of air flowing from the lower manifold 475 impinge against upper and lower surfaces of the neck of the bag for bonding the plastic to form hard seal 130h.

Caps 480 extend longitudinally above and below row 132 of perforations and divert air flow to form a plurality of air streams delivered through orifices in orifice plates 485a and 495a for forming spaced seal strips 130h and 130s. Since orifice plates 495a and 485a have different numbers of orifices formed therein, more heat is delivered through the orifice plate having the greater number of orifices than is delivered through the plate having the lesser number of orifices. It should be appreciated that each plate 485a and 495a may be provided with the same number of orifices but of a different size for controlling the heat transfer rate for forming soft seal strip 130s and hard seal strip 130h.

Figure 36:
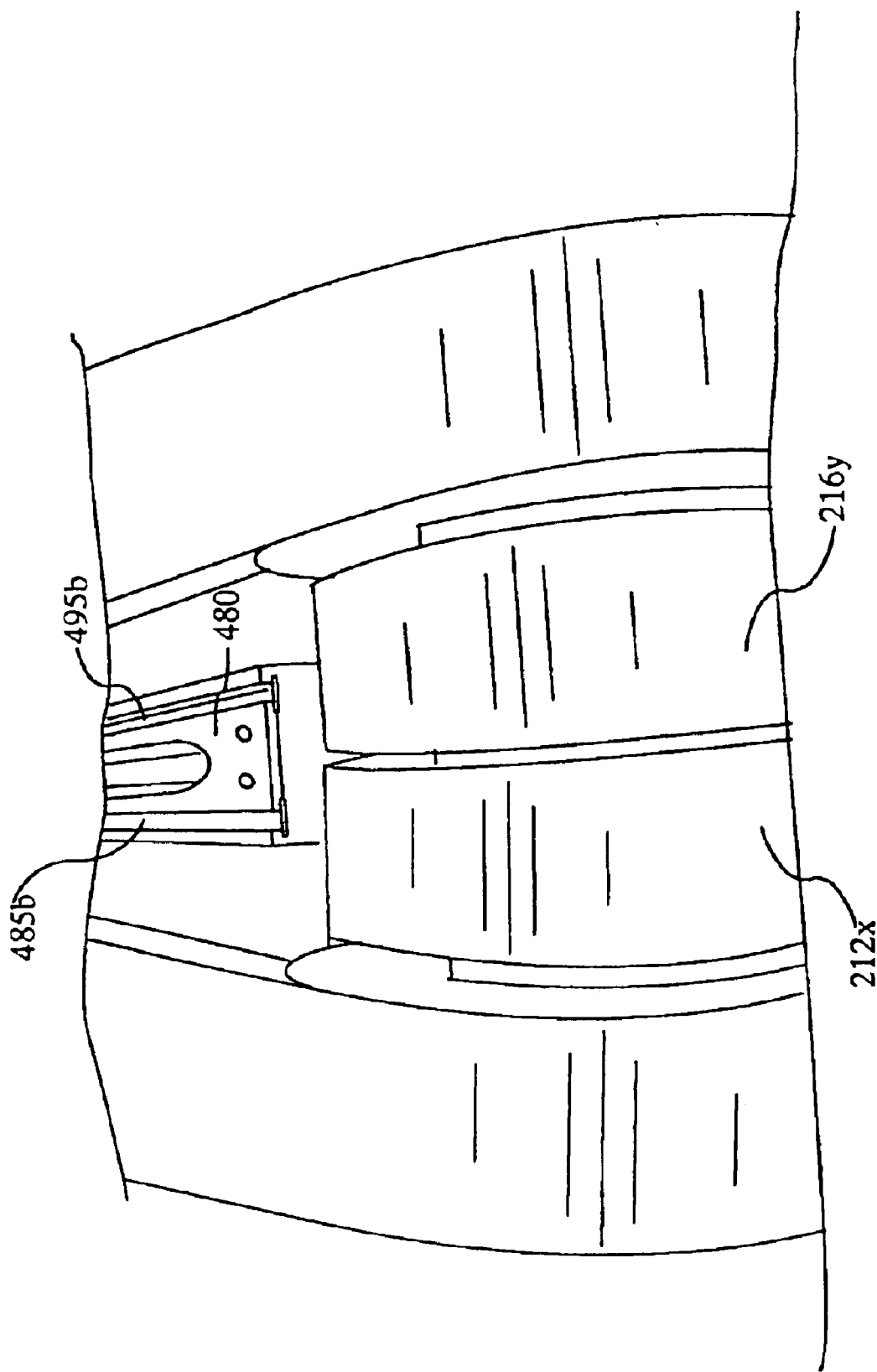
FIG. 36 is an end view of the bottom portion of the manifold.

FIG. 36 is an end view of the bottom portion of the manifold showing resilient rollers 212x and 216y positioned adjacent one end of cap 480 and adjacent ends of orifice strips 485b and 495b for compressing the softened plastic for compressing the softened plastic for forming seal strips 130s and 130h.

Figure 37:
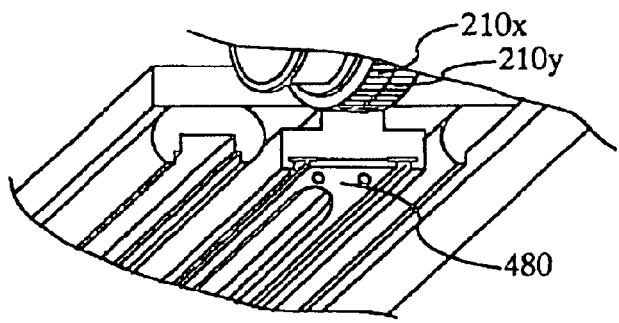
FIG. 37 is a view similar to FIG. 36 of the upper manifold showing knurled rollers.

FIG. 37 is a view similar to FIG. 36 of the upper manifold showing knurled rollers 210x and 210y mounted above resilient rollers 212x and 216y.

Figure 38:
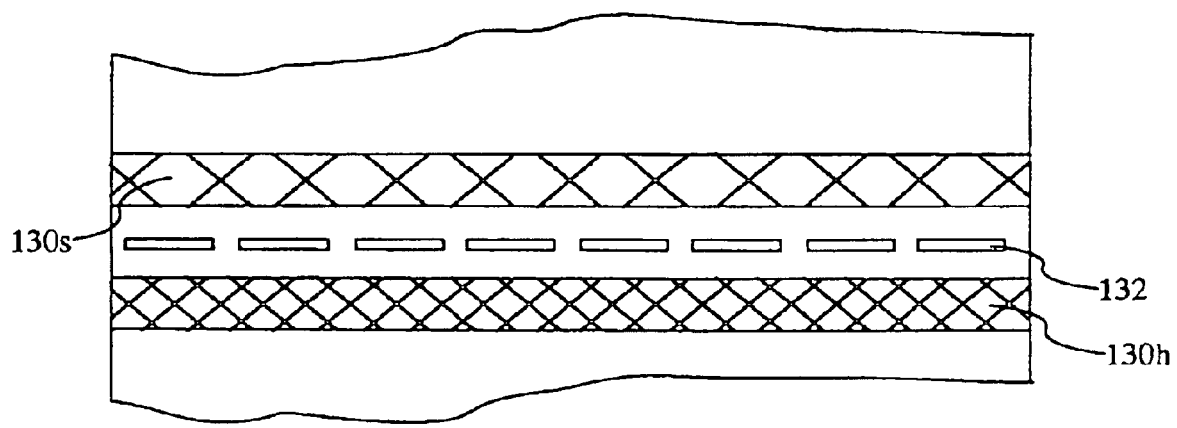
FIGS. 38 and 39 are copies of photographs of the spaced seal strips formed adjacent opposite sides of a row of perforations.
Figure 39:
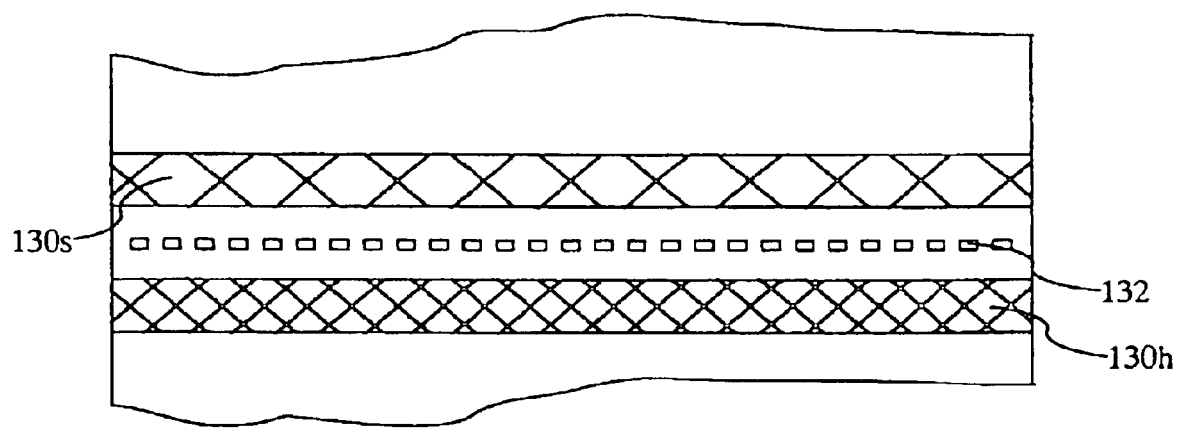

FIGS. 38 and 39 are copies of photographs of the spaced seal strips formed adjacent opposite sides of row 132 of perforations.

While preferred embodiments of the method and apparatus for forming a tamper resistant seal have been disclosed, it should be apparent that other and further embodiments may be devised without departing from the basic concepts of the invention.

Having described the invention, we claim:

1. A method of forming a tamper evident seal on a plastic bag containing a loaf of bread comprising the steps of:

flattening a portion of the neck of the bag adjacent the open end of the bag;

gripping spaced portions of the bag between a pair of horizontally spaced upper belts and a pair of horizontally spaced lower belts, said horizontally spaced upper and lower belts being arranged to engage spaced portions on the neck of a bag such that the neck bridges space between the belts;

forming a row of perforations across the neck of the bag between the loaf of bread in the bag and the open end of the bag neck;

forming first and second sealed ships on spaced portions on the neck that bridges space between the belts on the segment of the flattened portion adjacent opposite sides of the row of perforations, such that the loaf of bread in the bag is not accessible without removing the first sealed strip and opening the neck of the bag along the second sealed strip.

2. The method of claim 1 wherein the step of forming a first sealed strip on a segment of the flattened portion comprises moving the neck of the bag such that streams of heated air impinge on the surface of the bag for fusing panels on the bag together to form a sealed strip.

3. The method of claim 2 wherein the step of forming a first sealed strip comprises the steps of:

delivering air heated to a temperature in a range between about 315° and 600° Fahrenheit in a stream to impinge against the surface of the bag.

4. Apparatus for forming a tamper evident closure on a plastic bag containing a product comprising:

means for gripping spaced portions of the bag;

means for forming a row of perforations in the bag between the gripped portions of the bag; and means for delivering temperature controlled gas to impinge against the surfaces of the bag between the arrived portions for fusing portions of the bag between the gripped portions for forming hard and soft sealed strips, said perforations being positioned to permit removal of the hard sealed strip, said means for gripping spaced portions of the bag comprising horizontally spaced upper belts and horizontally spaced lower belts, said horizontally spaced upper and lower belts being arranged to engage spaced portions on the neck of a bag such that the neck bridges space between the belts.

5. Apparatus for forming a tamper evident closure on a plastic bag according to claim 4, said means for forming a row of perforations in the bag between the gripped portions comprising an anvil having a slot formed therein adjacent one side of the neck of the bag and a perforator wheel having cutter teeth positioned adjacent the other side of the bag neck such that said teeth perforate the bag and extend into the slot formed in the anvil when a bag neck moves between the anvil and the perforator wheel.

6. Apparatus for forming a tamper evident closure on a plastic bag according to claim 4, said means for delivering temperature controlled gas to impinge against the surface of the bag comprising an upper manifold positioned above the neck of the bag and a lower manifold positioned below the neck of the bag; and means for delivering air through said upper and lower manifolds for impinging against the neck of the bag, said air being heated to a temperature sufficient for melting the bag neck for forming sealed strips extending generally parallel to said row of perforations.

7. Apparatus for forming a tamper evident closure on a plastic bag according to claim 6, with the addition of a diverter valve adjacent each of said upper and lower manifolds, each said diverter valve being actuatable to divert air flow from said upper and lower manifolds and to exhaust air, without interruption of the flow of air into the diverter valves.

8. Apparatus for forming a tamper evident closure on a plastic bag containing a product comprising:

a conveyor for moving a plastic bag containing a product along a path, said bag having an open end forming a neck extending beyond the product in the bag;

an air nozzle for flattening the open neck as the bag is moved by said conveyor;

a pair of upper brushes and a pair of lower brushes, a first of said pair of upper and lower brushes having bristles arranged to engage the flattened neck of the bag and draw the bag transversely across said conveyor, second upper and lower brushes having angularly inclined bristles for moving the leading edge of the bag neck longitudinally of the conveyor while the trailing edge of the bag neck is engaged by the first upper and lower brushes;

a pair of upper belts and a pair of lower belts, said upper and lower belts being horizontally spaced apart such that one of said upper belts and one of said lower belts engage opposite sides of a portion of the neck of the bag and one of said upper belts and one of said lower belts engages a second portion of said bag neck such that a portion of the bag neck bridges space between the upper pair of belts and the lower pair of belts; and upper and lower air dispensers positioned to deliver heated air to impinge against upper and lower surfaces of the portion of the bag neck bridging between the belts for melting and forming a soft sealed strip across the entire width of the bag neck for forming a seal on the bag neck to permit opening the neck of the bag along the soft sealed strip.

9. Apparatus for forming a tamper evident closure on a plastic bag containing a product comprising:

a conveyor for moving a plastic bag containing a product along a path, said bag having an open end forming a neck extending beyond the product in the bag;

an air nozzle for flattening the open neck as the bag is moved by said conveyor;

a pair of upper belts and a pair of lower belts, said upper and lower belts being horizontally spaced apart such that one of said upper belts and one of said lower belts engage opposite sides of a portion of the neck of the bag and one of said upper belts and one of said lower belts engages a second portion of said bag neck such that a portion of the bag neck bridges space between the upper pair of belts and the lower pair of belts;

a perforator wheel adjacent one side of said bag neck and an anvil having a slot formed therein adjacent the other side of the bag neck, said perforator wheel forming a row of perforations in the neck of the bag moved by said upper and lower belts; and upper and lower air dispensers positioned to deliver heated air to impinge against upper and lower surfaces of the portion of the bag neck bridging between the belts for melting and forming first and second seal strips adjacent opposite sides of a row of perforations, said first seal strip being a hard seal that can be torn from the bag when the bag is torn along the row of perforations, and said second seal being a soft seal formed to permit flaps of the bag to be separated along the soft seal for accessing the contents of the bag, said soft seal being configured to assure that the contents of the bag remain fresh and to prevent contamination.

10. Apparatus for forming a tamper evident closure on a plastic bag containing a product comprising:

a conveyor for moving a plastic bag containing a product along a path, said bag having an open end forming a neck extending beyond the product in the bag;

a pair of upper belts and a pair of lower belts, said upper and lower belts being horizontally spaced apart such that one of said upper belts and one of said lower belts engage opposite sides of a portion of the neck of the bag and one of said upper belts and one of said lower belts engages a second portion of said bag neck such that a portion of the bag neck bridges space between the upper pair of belts and the lower pair of belts;

upper and lower air dispensers positioned to deliver heated air to impinge against upper and lower surfaces of the portion of the bag neck bridging between the horizontally spaced belts for melting and forming a sealed strip across the width of the bag neck; and motor driven upper and lower gathering belts synchronized with said upper and lower belts for moving bags along a path to a position adjacent a needle assembly, a twister hook assembly and a holder-shear assembly for wrapping a wire-like tie around the neck of the bag.

11. Apparatus for forming a tamper evident closure on a plastic bag containing a product according to claim 10, further comprising:

means for forming a row of perforations in the bag between the gripped portions of the bag; and means spaced from said means for forming a row of perforations for delivering temperature controlled gas to impinge against the surfaces of the bag between the gripped portions for fusing portions of the bag between the gripped portions for forming hard and soft sealed strips, said perforations being positioned between the sealed strips to permit removal of the hard sealed strip.

12. Apparatus for forming a tamper evident closure on a plastic bag according to claim 11, said means for forming a row of perforations in the bag adjacent the gripped portions comprising:

an anvil having a slot formed therein adjacent one side of the neck of the bag and a perforator wheel having cutter teeth positioned adjacent the other side of the bag neck such that said teeth perforate the bag and extend into the slot formed in the anvil when a bag neck moves between the anvil and the perforator wheel.

13. Apparatus for forming a tamper evident closure on a plastic bag according to claim 10, said upper and lower air dispensers positioned to deliver heated air to impinge against upper and lower surfaces of the portion of the bag neck comprising:

an upper manifold positioned above the neck of the bag and a lower manifold positioned below the neck of the bag; and means for delivering air through said upper and lower manifolds for impinging against the neck of the bag, said air being heated to a temperature sufficient for melting the bag neck for forming a sealed strip.

14. Apparatus for forming a tamper evident closure on a plastic bag according to claim 13, with the addition of:

a diverter valve adjacent each of said upper and lower manifolds, said diverter valve being actuatable to divert air flow from said upper and lower manifolds and to exhaust air, without interruption of the flow of air into the diverter valves.

\* \* \* \* \*